US011754471B1

(12) United States Patent
Edren et al.

(10) Patent No.: US 11,754,471 B1
(45) Date of Patent: Sep. 12, 2023

(54) TECHNIQUES FOR TESTING A DEFLECTION OF A STRUCTURAL SECTION OF A VEHICLE

(71) Applicant: Zoox, Inc., Foster City, CA (US)

(72) Inventors: Johannes Edren, Belmont, CA (US); Ahditya Melkote, Foster City, CA (US); Keith David Myers, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 126 days.

(21) Appl. No.: 17/246,344

(22) Filed: Apr. 30, 2021

(51) Int. Cl.
*G01M 17/04* (2006.01)
*B60W 10/22* (2006.01)
*B60W 40/12* (2012.01)

(52) U.S. Cl.
CPC ............ *G01M 17/04* (2013.01); *B60W 10/22* (2013.01); *B60W 40/12* (2013.01); *B60W 2510/222* (2013.01)

(58) Field of Classification Search
CPC .... G01M 17/04; G01M 17/007; B60W 10/22; B60W 40/12; B60W 2510/222; G01B 11/16; G01B 5/30; G01B 21/26; B01N 5/0041
USPC .................................................. 73/669, 670
See application file for complete search history.

(56) References Cited

U.S. PATENT DOCUMENTS

| 4,768,374 A | * | 9/1988 | Fouchey | ............... B60G 11/20 73/115.07 |
| 2008/0257029 A1 | * | 10/2008 | Pfadenhauer | ......... G01M 9/062 73/147 |

OTHER PUBLICATIONS https://www.ti.com/lit/an/slaa907d/slaa907d.pdf (Year: 2020).*

* cited by examiner

*Primary Examiner* — Eric S. McCall
*Assistant Examiner* — Timothy P Graves
(74) *Attorney, Agent, or Firm* — Lee & Hayes, P.C.

(57) ABSTRACT

Techniques and methods for testing a structural integrity of a vehicle. For instance, the vehicle may use suspension(s) to lift corners of the vehicle, where lifting the corners creates a torsion force in the body of the vehicle. The vehicle may then use sensor(s) to determine a deflection that is caused by the torsion force. Next, the vehicle may determine a stiffness associated with the body of the vehicle using the force that was applied to lift the corners and the deflection. After determining the stiffness, the vehicle may compare the stiffness to a baseline stiffness in order to determine whether there is a problem with the structural integrity of the vehicle. The baseline stiffness may include s standard stiffness or be based on a previous test of the vehicle. If the vehicle determines that there is no problem, then the vehicle may continue to operate as intended.

20 Claims, 10 Drawing Sheets

TECHNIQUES FOR TESTING A DEFLECTION OF A STRUCTURAL SECTION OF A VEHICLE

BACKGROUND

In order for vehicles to operate as intended, it is important that the vehicles are structurally sound both after manufacturing and during operation. However, many factors may cause problems to occur with the structural integrity of a vehicle, such as with the stiffness of the body of the vehicle. For example, defects in the manufacturing of the vehicle, wear that occurs during normal operation of the vehicle, and/or events, such as driving over potholes or collisions with other objects, may impact the stiffness of the body of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
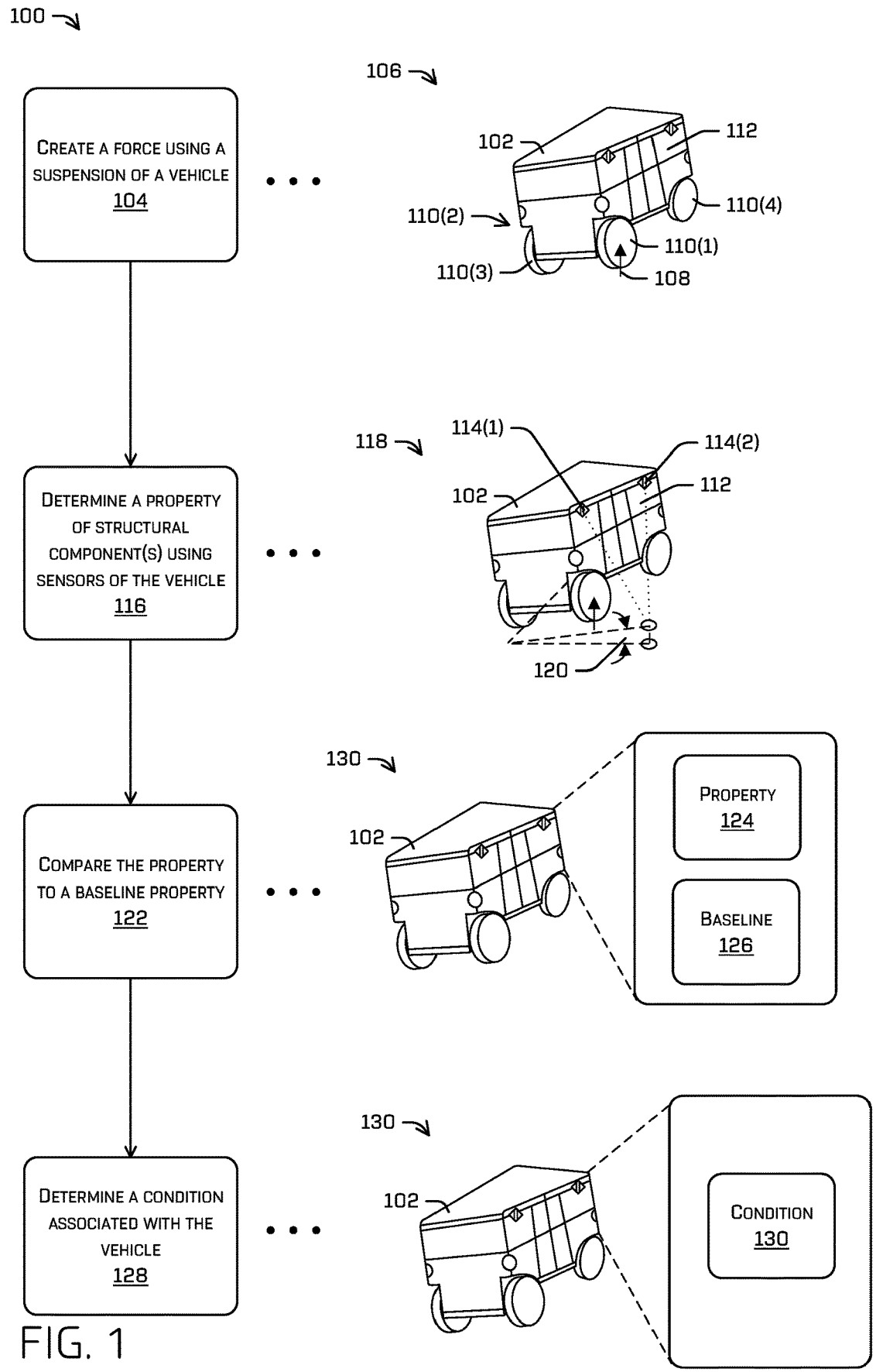
FIG. 1 is a pictorial flow diagram of an example process for testing a structural integrity of a vehicle.

As described above, in order for vehicles to operate as intended, it is important that the vehicles are structurally sound both after manufacturing and during operation. However, many factors may cause problems to occur with the structural integrity of a vehicle, such as with the stiffness of the body of the vehicle. For example, defects in the manufacturing of the vehicle, wear that occurs during normal operation of the vehicle, and/or events, such as driving over potholes or collisions with other objects, may impact the stiffness of the body of the vehicle. Because of this, it may be important to test at least the stiffness of the body of the vehicle in order to ensure that the vehicle is structurally sound for operation.

As such, this disclosure relates to techniques for testing a structural integrity of a vehicle, such as an autonomous vehicle. For instance, computing device(s) may use suspensions of the vehicles in order to apply a force that lifts one or more corners of the vehicle, such as opposing corners of the vehicle. This lifting of the corners of the vehicle may cause a torsion load to be applied on the body of the vehicle. The computing device(s) may then receive sensor data generated by one or more sensors of the vehicle. Using the sensor data, the computing device(s) may determine a deflection that is caused by the torsion load that is applied to the body of the vehicle. In some examples, the computing device(s) may then determine a stiffness associated with the body of the vehicle based at least on the force that is applied to of the body of the vehicle and the deflection. In some examples, the computing device(s) may then use the deflection and/or the stiffness to determine whether the vehicle is structurally sound for operation.

In some examples, the computing device(s) may determine to test the vehicle. In some examples, the computing device(s) determine to test the vehicle after manufacturing of the vehicle (e.g., perform an initial test of the vehicle before putting the vehicle into service), at given time intervals (e.g., every hour, every day, every two days, every week, every month, every year, etc.), when the vehicle is scheduled for service, and/or when an event occurs that may affect the structural integrity of the body of the vehicle. As described herein, the event may include, but is not limited to, the vehicle navigating over a pothole, the vehicle navigating over a speedbump, the vehicle being involved in a collision, the vehicle experiencing extreme weather, and/or any other event that may affect the structural integrity of the body or frame of the vehicle.

In some examples, before testing the vehicle, the computing device(s) may determine that one or more testing parameters are satisfied for the test (e.g., the vehicle is operating in a nominal state). The testing parameter(s) may include, but are not limited to, vehicle testing parameter(s) and/or environmental testing parameters(s). As described herein, a vehicle testing parameter may include, but is not limited to, doors being open/closed (e.g., statuses of the doors), windows being open/closed (e.g., statuses of the windows), a trunk being open/closed (e.g., a status of the trunk), a temperature inside of the vehicle, a period of time before last operation of the vehicle, a number of passengers within the vehicle, positions of seats within the vehicle, and/or any other parameter. Additionally, an environmental parameter may include, but is not limited to, weather conditions (e.g., temperature, humidity, etc.), a time of day, week, month, and/or year, and/or any other parameter. In these examples, the computing device(s) may initially determine that the testing parameter(s) are satisfied so that the test is similar to any previous and/or future testing of the vehicle.

To test the vehicle, the computing device(s) may initially receive sensor data (referred to, in these examples, as "first sensor data") generated by the one or more sensors of the vehicle. The sensor(s) may include, but are not limited to, light detection and ranging (lidar) sensor(s), radar sensor(s), imaging device(s) (e.g., camera(s)), inertial measurement (IMU) sensor(s), and/or any other type of sensor(s). In some examples, the one or more sensors generate the first sensor data while the suspension of the vehicle is in a first state. As described herein, the suspension may be in the first state when the vehicle is not using the suspension retract or extend wheels of the vehicle and/or when all of the corners of the vehicle are lifted to a nominal height.

Next, the computing device(s) may use a suspension component associated with the vehicle to retract or extend wheel(s) of the vehicle. As described herein, retracting or extending the wheel(s) of the vehicle may cause a twisting of structural component(s) of the vehicle, which can create a torsion load on the structural component(s) of the vehicle through the force of gravity acting on a portion of the frame or body being unsupported by the suspension system. In some examples, the computing device(s) may cause the suspension to retract or extend opposing wheels of the vehicle. For a first example, the computing device(s) use the suspension to extend the front-right wheel and back-left wheel of the vehicle. For a second example, the computing device(s) may use the suspension to extend the front-left wheel and back-right wheel of the vehicle. In some instances, extending the opposing wheels of the vehicle may create the greatest amount of torsion load on the structural component(s) of the vehicle. However, in other examples the torsional load may be applied differently (e.g., each wheel of the vehicle may be retracted or extended individually).

In some examples, extending or retracting the wheel(s) of the vehicle may cause the suspension of the vehicle to be in a second state. As described herein, the suspension may be in the second state when the vehicle is using the suspension to retract or extend at least one wheel of the vehicle. For instance, the suspension may be in the second state when the vehicle is experiencing the torsion load.

In some examples, after retracting or extending the corner(s) of the vehicle, the computing device(s) may initially test the suspension of the vehicle. For example, the computing device(s) may receive sensor data (referred to, in these examples, as "second sensor data") from one or more sensors associated with the vehicle. The computing device(s) may then analyze the second sensor data to determine actual height(s) (e.g., ride height(s)) associated with the lifted corner(s) of the vehicle. Next, the computing device(s) may compare the actual height(s) of the lifted corner(s) to expected height(s) for the lifter corner(s). If the computing device(s) determine that the actual height(s) are similar to the expected height(s) (e.g., within a threshold distance, within a threshold percentage, etc.), then the computing device(s) may determine a first condition associated with the suspension (e.g., determine that the suspension is operating as intended). However, if the computing device(s) determine that the actual height(s) are not similar to the expected height(s) (e.g., outside of the threshold distance, outside of the threshold percentage, etc.), then the computing device(s) may determine that a second condition associated with the suspension (e.g., determine that the suspension is not operating as intended).

The computing device(s) may then determine a deflection associated with the structural component(s) of the vehicle when the structural component(s) are experiencing the torsion load. To determine the deflection, the computing device(s) may receive sensor data (referred to, in these examples, as "third sensor data") generated by one or more sensors of the vehicle. In some examples, the sensor(s) that generated the third sensor data may include the same sensors that generated the first sensor data. The computing device(s) may then analyze the first sensor data and the third sensor data in order to determine the deflection. For example, and such as when the sensor(s) include lidar sensor(s), the computing device(s) may analyze the first sensor data in order to determine a portion of the first sensor data represents a point. The computing device(s) may then analyze the third sensor data to in order to determine a portion of the third sensor data represents the point. The computing device(s) may then determine the deflection based on the portion of the first sensor data and the portion of the third sensor data.

In some examples, the computing device(s) may use the deflection in order to determine a condition associated with the vehicle (e.g., determine whether the vehicle is structurally sound for operation). For example, the computing device(s) may compare the deflection to a baseline deflection in order to determine if there is a problem with the vehicle. In some examples, the baseline deflection includes a standard deflection for all vehicles (that are similar to the vehicle) to satisfy in order to be structurally sound for operation. For example, the standard deflection may include a range of deflections, where the computing device(s) determine that the vehicle is structurally sound when the deflection satisfies (e.g., is within) the range. For instance, the computing device(s) may determine that there is not a problem with the vehicle when the deflection satisfies (e.g., is within) the range and determine that there is a problem with the vehicle when the deflection does not satisfy (e.g., is below) the range.

Additionally, or alternatively, in some examples, the baseline deflection may be based on a change in deflection that occurs with the vehicle, where the change in deflection is based on one or more previous deflections determined for the vehicle during previous test(s). For example, the computing device(s) may determine a difference between the deflection and a previous deflection for the vehicle determined during a previous test. The previous test may include an initial test of the vehicle (e.g., a test that occurred after manufacturing of the vehicle, but before operation), a preceding test that occurred directly before the current test, and/or any other test performed on the vehicle. Using the difference, the computing device(s) may then determine whether there is a problem with the vehicle. For example, the computing device(s) may determine that there is not a problem with the vehicle when the difference satisfies (e.g., is equal to or less than) a threshold difference and determine that there is a problem with the vehicle when the difference does not satisfy (e.g., is greater than) the threshold difference.

Additionally to, or alternatively from, using the deflection to determine whether there is a condition with the vehicle, in some examples, the computing device(s) may determine a stiffness associated with the structural component(s) based at least on the deflection and torsion force and then use the stiffness to determine whether there is the condition. For example, the computing device(s) may determine the stiffness by dividing the force applied to retract or extend the wheel(s) of the vehicle by the deflection. Additionally, the computing device(s) may use the stiffness in order to determine a condition associated with the vehicle (e.g., determine whether the vehicle is structurally sound for operation). For example, the computing device(s) may compare the stiffness to a baseline stiffness in order to determine if there is a problem with the vehicle.

In some examples, the baseline stiffness includes a standard stiffness for all vehicles (that are similar to the vehicle) to satisfy in order to be structurally sound for operation. For example, the standard stiffness may include a range of stiffnesses, where the computing device(s) determine that the vehicle is structurally sound when the stiffness satisfies (e.g., is within) the range. For instance, the computing device(s) may determine that there is not a problem with the vehicle when the stiffness satisfies (e.g., is within) the range and determine that there is a problem with the vehicle when the stiffness does not satisfy (e.g., is below) the range.

Additionally, or alternatively, in some examples, the baseline stiffness may be based on a change in stiffness that occurs with the vehicle, where the change in stiffness is based on one or more previous stiffnesses determined for the vehicle during previous test(s). For example, the computing device(s) may determine a difference between the stiffness and a previous stiffness for the vehicle determined during a previous test. The previous test may include an initial test of the vehicle (e.g., a test that occurred after manufacturing of the vehicle, but before operation), a preceding test that occurred directly before the current test, and/or any other test performed on the vehicle. Using the difference, the computing device(s) may then determine whether there is a problem with the vehicle. For example, the computing device(s) may determine that there is not a problem with the vehicle when the difference satisfies (e.g., is equal to or less than) a threshold difference and determine that there is a problem with the vehicle when the difference does not satisfy (e.g., is greater than) the threshold difference.

In some examples, the computing device(s) may perform one or more additional and/or alternative tests on the vehicle. For example, during a calibration process for the testing of the vehicle, the computing device(s) may determine an offset between two sensors of the vehicle. In some examples, the computing device(s) determine the offset using sensor data generated by the sensors. The computing device(s) may then use the offset between the sensors in order to detect creep associated with the body of the vehicle and/or mounts of the sensors. For example, the computing device(s) may compare the offset to a previous offset between the sensors determined during the calibration process for a previous test of the vehicle. The computing device(s) may then determine that there is no creep between the sensors when the difference satisfies (e.g., is less than or equal to) a threshold distance and detect a creep when the difference does not satisfy (e.g., is greater than) the threshold distance.

The computing device(s) may then perform one or more actions based on the condition associated with the vehicle. For a first example, and when the computing device(s) determine that there is not a problem with the vehicle (e.g., the vehicle is structurally sound), the computing device(s) may generate and/or send data indicating that the vehicle is structurally sound, generate and/or send data indicating the results of the test (e.g., the determined stiffness), continue operating, and/or the like. For a second example, and when the computing device(s) determine that there is the problem with the vehicle (e.g., the vehicle is not structurally sound), the computing device(s) may generate and/or send data indicating that the vehicle is not structurally sound, generate and/or send data indicating the results of the test (e.g., the determined stiffness), cease operating, and/or the like.

As described above, the vehicle may determine the structural integrity associated with the structural component(s) of the vehicle. In some examples, the structural component(s) of the vehicle may include, but are not limited to, the frame, the doors, the windows, the bumpers, the floor panel, the grill, panel(s), and/or one or more additional and/or alternative components of the vehicle. As such, the deflection and/or stiffness of the structural component(s) of the vehicle may depend upon the locations of components of the vehicle and/or the material of the components. It is because of this, when comparing a deflection and/or a stiffness to a baseline deflection and/or a baseline stiffness, the baseline deflection and/or the baseline stiffness may be associated with vehicles that are similar to one another (e.g., include the same components, include the same materials, etc.).

By performing the processes described herein, the computing device(s) are able to determine the structural integrity of the vehicle. For instance, the computing device(s) are able to use the suspension(s) and the sensors of the vehicle to automatically determine whether there is a problem with the suspension, determine whether there is a defect and/or problem with the stiffness of the body of the vehicle, and/or detect creep associated with the body of the vehicle and/or mounts of the sensors. Additionally, by performing the processes described herein, the computing device(s) are able to track the structural integrity of the vehicle by testing the vehicle at set time intervals and/or when an event occurs with the vehicle that may affect the structural integrity of the vehicle.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system evaluating distances between reference lines in an environment (e.g., in a system using route-relative planning). Additionally, the techniques described herein may be used with real data (e.g., captured using sensor(s)), simulated data (e.g., generated by a simulator), or any combination of the two.

FIG. 1 is a pictorial flow diagram of an example process 100 for testing a structural integrity of a vehicle 102, in accordance with the disclosure. At operation 104, the process 100 may include creating a force using a suspension of a vehicle. For instance, an example 106 illustrates the vehicle 102 creating the force 108 by raising or lowering corner(s) of the vehicle 102 using the suspension. In some examples, and as illustrated by the example of FIG. 1, the vehicle 102 creates the force by extending wheels 110(1)-(2) of the vehicle 102, relative to structural component(s) of the vehicle 102 (where the raising of the wheel 110(2) is not illustrated in the example of FIG. 1). Additionally, in some examples, the vehicle 102 may remove any force that is being applied to a third wheel 110(3) or a fourth wheel 110(4).

In some examples, the vehicle 102 may determine to perform the test after manufacturing of the vehicle 102 (e.g., perform an initial test of the vehicle 102), at an elapse of a given time interval, when the vehicle 102 is scheduled for service, and/or when an event occurs that may affect the integrity of structural component(s) 112 of the vehicle 102. Additionally, in some examples, the vehicle 102 may initially determine that one or more parameters associated with testing the vehicle 102 are satisfied before performing the test. As described above, the parameter(s) may include vehicle parameter(s) and/or environmental parameter(s).

In some examples, before creating the force, the vehicle 102 may use sensor(s) 114(1)-(2) (also referred to as "sensors 114") to generate first sensor data. As described herein, this first sensor data is associated with a first state of the suspension.

Figure 2A:
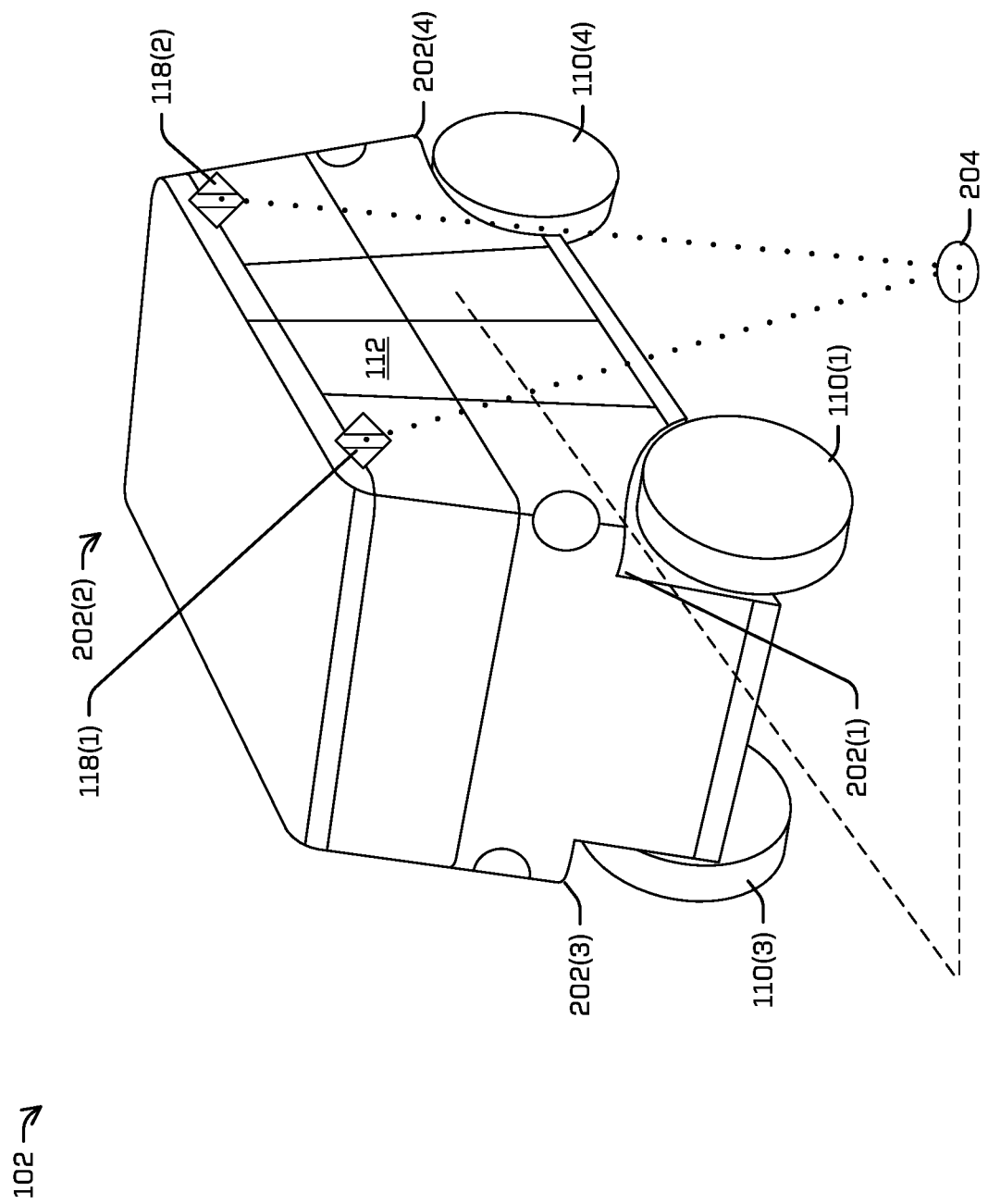
FIG. 2A is a first example of a vehicle determining a deflection when a torsion load is not being applied to the vehicle.
Figure 2B:
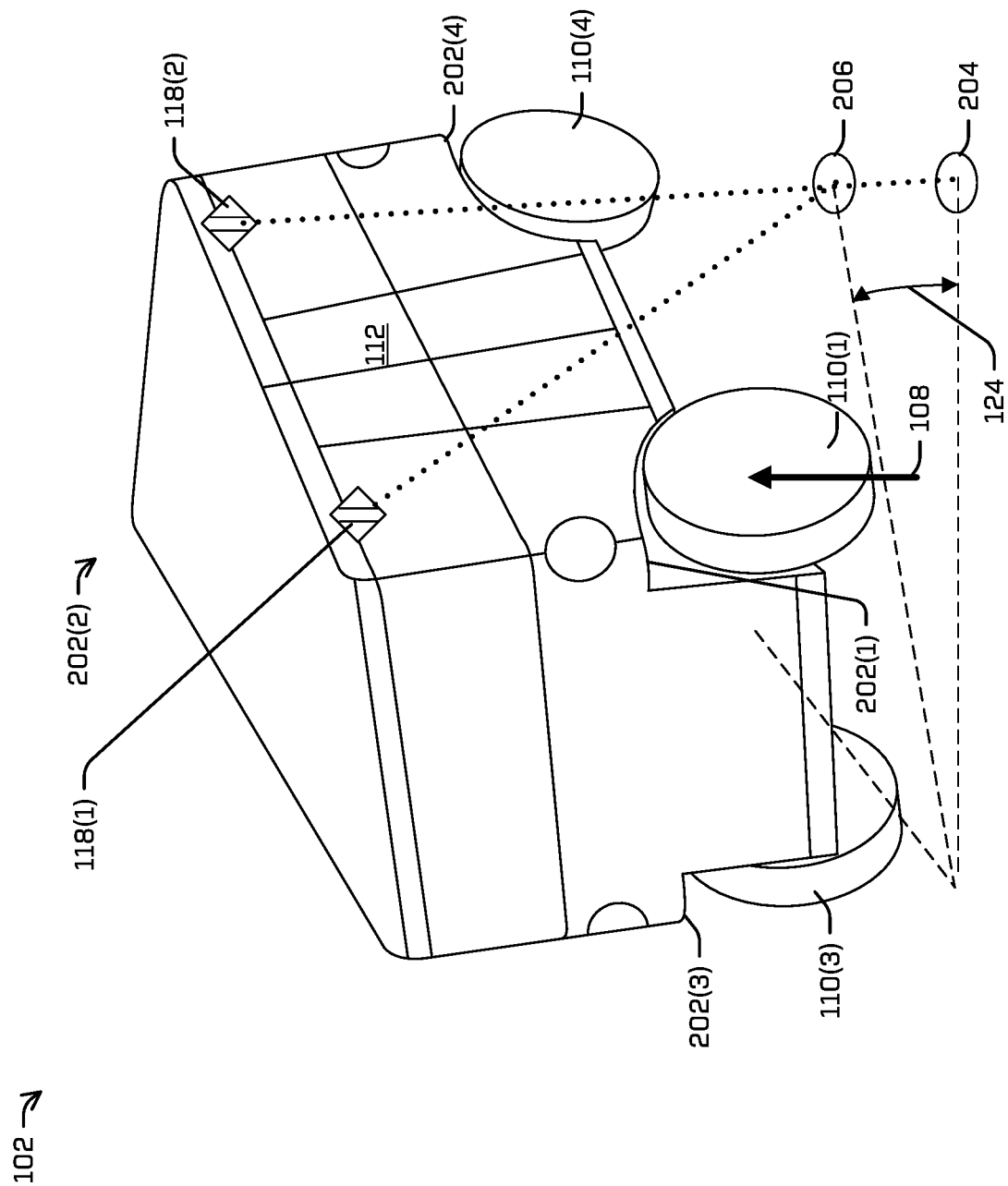
FIG. 2B is a first example of a vehicle determining a deflection when the torsion load is being applied to the vehicle.

At operation 116, the process 100 may include determining a property of structural component(s) using sensors of the vehicle For instance, and as shown in more detail with regard to FIG. 2B, an example 118 illustrates that by applying the force 108 to the wheels 110(1)-(2) of the vehicle 102, the vehicle 102 is able to create a torsion load on the structural component(s) 112 of the vehicle 102. This torsion load may cause the structural component(s) 112 of the vehicle 102 to deform (e.g., twist). By deforming the structural component(s) 112 of the vehicle 102, locations and/or orientations of sensors 114(1)-(2) located on the vehicle 102 may change with respect to the environment around the vehicle 102. In some examples, the suspension may be associated with a second state when the torsion load is being applied to the vehicle 102.

As such, and after creating the force 108 using the suspension of the vehicle 102, the vehicle 102 may use the sensors 114 to generate second sensor data. As will be described in more detail below, the vehicle 102 may then analyze the first sensor data and the second sensor data in order to determine the a value of the property that is caused by the force 108 being applied to the vehicle 102. The value of the property may include a deflection, a stiffness, and/or any other property associated with the structural component(s).

At 122, the process 100 may comparing the property to a baseline property. For instance, the vehicle 102 may compare a value of the property 124 to a baseline value associated with a baseline property 126. For a first example, if the property 124 includes a deflection, then the vehicle 102 may compare the deflection to a baseline deflection. For a second example, if the property 124 includes a stiffness, then the vehicle 102 may compare the stiffness to a baseline stiffness. In some examples, the baseline property 132 may include a range for all vehicles to satisfy in order for the vehicles to be structurally sound. Additionally, or alternatively, in some examples, the baseline property may be based on one or more previous values of properties determined for the vehicle 102 during previous test(s).

At 128, the process 100 may include determining a condition associated with the vehicle. For instance, an example 130 illustrates that the vehicle 102 may determine, based on the comparing, if the condition 130 associated with the structural integrity of the vehicle 102. The vehicle 102 may then generate data representing the condition associated with the vehicle 102. Additionally, the vehicle 102 may generate data representing the value of the property 124 so that the vehicle 102 may use the value for future tests.

FIG. 2A is a first example of the vehicle 102 determining a value or a property when a torsion load is not being applied to the vehicle 102, in accordance with the disclosure. As shown, the vehicle 102 may not be applying the force 108 and as such, each corner 202(1)-(4) (also referred to as "corners 202") of the vehicle 102 may include the same ride height. As such, the structural component(s) 112 of the vehicle 102 may not be experiencing the torsion load in the example of FIG. 2A (e.g., the suspension of the vehicle 102 may be in the first state). Because the vehicle 102 is not experiencing the torsion load, the vehicle 102 may determine a first value of the property 124. For example, the vehicle 102 may determine that there is no deflection.

For a first example, the vehicle 102 may generate sensor data using the sensors 114. The vehicle 102 may then analyze the sensor data in order to identify a point 204 that is detected by each of the sensors 114. For example, the vehicle 102 may determine that a first portion of first sensor data generated the first sensor 114(1) and that a second portion of second sensor data generated by the second sensor 114(2) both represent the point 204. Additionally, based on a calibration of the sensors 114, the vehicle 102 may know that the first portion of the first sensor data should match the second portion of the second sensor data (e.g., they should both represent a same point in space). As such, the vehicle 102 may determine that there is no deflection.

For a second example, the vehicle 102 may again generate sensor data using the sensors 114. The vehicle 102 may then analyze the sensor data in order to determine a first height of the first sensor 114(1) and/or a second height of the second sensor 114(2). Next, the vehicle 102 may compare the first height of the first sensor 114(1) to an expected first height for the first sensor 114(1) and/or compare the second height of the second sensor 114(2) to an expected second height for the second sensor 114(2). Based on the comparison, the vehicle 102 may determine that the first height is similar to (e.g., within a threshold from) the expected first height and/or that the second height is similar to (e.g., within a threshold from) the second expected height. Based on the determination(s), the vehicle 102 may determine that there is no deflection since the heights of the sensors 114 are correct.

Next, the vehicle 102 may perform the test to determine a second value of the property 124. For example, FIG. 2B is a first example of the vehicle 102 determining the second value of the property 124 when the torsion load is being applied to the vehicle 102, in accordance with the disclosure. For instance, and as shown, the vehicle 102 may now apply the force 108 using the suspension of the vehicle 102 that causes the first wheel 120(1) and the second wheel 120(2) to extend. As such, the first corner 202(1) and the second corner 202(2) of the vehicle 102 may rise to a new height, which causes the structural component(s) 112 of the vehicle 102 to experience a torsion load (e.g., a twisting of the structural component(s) 112 causes the torsion load). Because of the torsion load, the vehicle 102 may now be able to determine that there is a second value of the property 124.

For a first example, and as illustrated in the example of FIG. 2B, the vehicle 102 may generate sensor data using the sensors 114. The vehicle 102 may then analyze the sensor data in order to identify a new point 206 (that is associated with the point 204) that is detected by each of the sensors 114. For example, the vehicle 102 may determine that a third portion of third sensor data generated the first sensor 114(1) and that a fourth portion of fourth sensor data generated by the second sensor 114(2) both represent the point 206. Additionally, based on a calibration of the sensors 114 (which may be calibrated based on the sensor data generated in the example of FIG. 2A), the vehicle 102 may determine the second value of the property 124 based on the third portion of the third sensor data and the fourth portion of the fourth sensor data representing the point 206. As shown, second value of the property 124 is a deflection, which corresponds to the change that occurs between the point 204 and the point 206, where the third portion of the third sensor data and/or the fourth portion of the fourth sensor data should represent the point 204 without the torsion load being applied to the vehicle 102 (as illustrated in FIG. 2A).

For a second example, the vehicle 102 may again generate sensor data using the sensors 114. The vehicle 102 may then analyze the sensor data in order to determine a third height of the first sensor 114(1) and/or a fourth height of the second sensor 114(2). Next, the vehicle 102 may compare the third height of the first sensor 114(1) to the expected first height of the first sensor 114(1) and/or compare the fourth height of the second sensor 114(2) to the expected second height of the second sensor 114(2). Based on the comparison, the vehicle 102 may determine that the third height is not similar to (e.g., outside of the threshold from) the expected first height and/or that the fourth height is not similar to (e.g., outside the threshold from) the second expected height. Based on the determination(s), the vehicle 102 may determine that there is the second value of the property 124 since the heights are incorrect.

In some examples, to then determine the second value of the property 124, the vehicle 102 may determine a first difference between the third height and the first expected height and/or a second difference between the fourth height and the second expected height. The vehicle 102 may then determine the second value of the property 124 based on the first difference and/or the second difference.

Figure 3A:
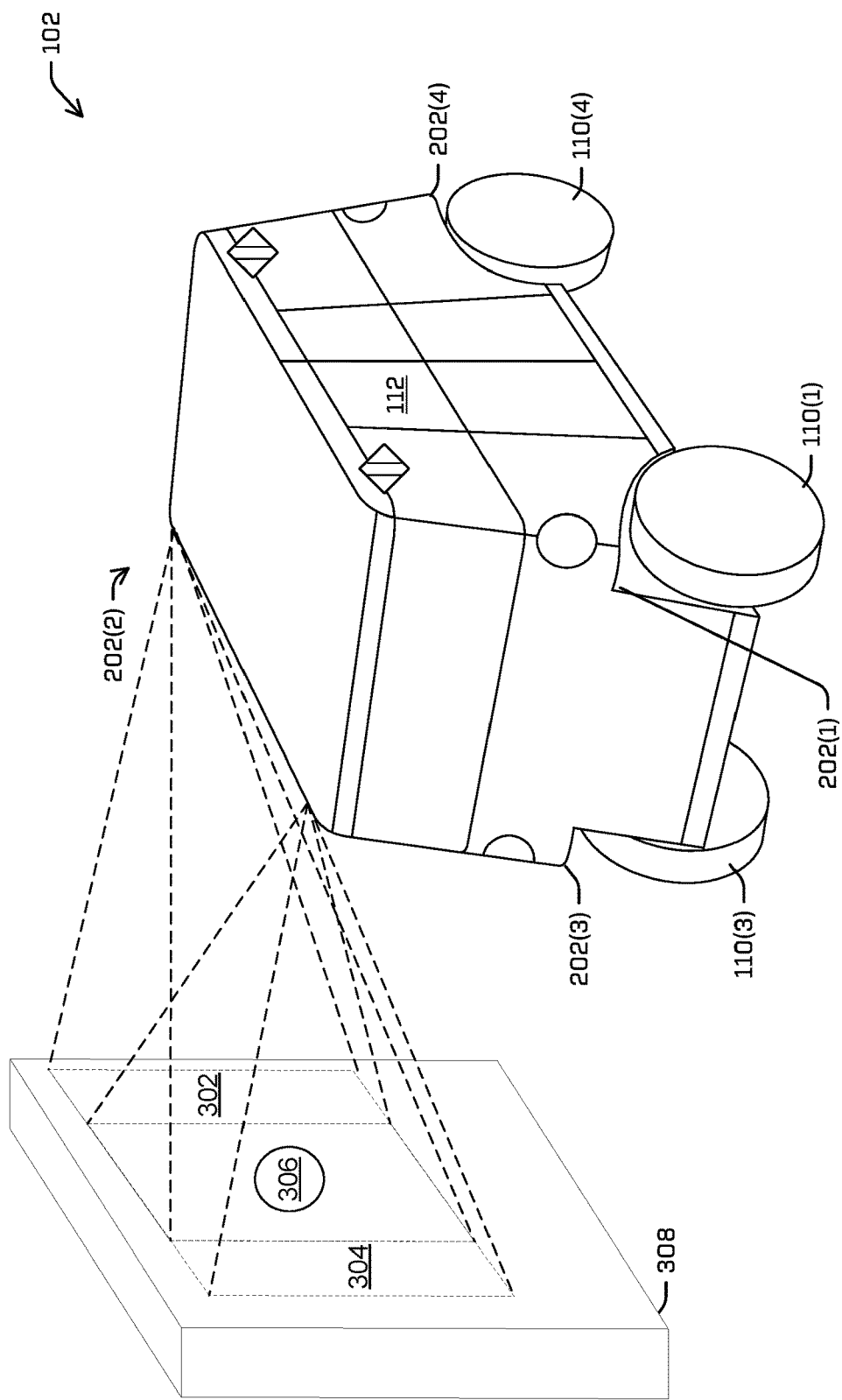
FIG. 3A is a second example of a vehicle determining a deflection when a torsion load is not being applied to the vehicle.

FIG. 3A is a second example of the vehicle 102 determining a deflection when a torsion load is not being applied to the vehicle 102, in accordance with the disclosure. As shown, the vehicle 102 may not be applying the force 108 and as such, each corner 202(1)-(4) of the vehicle 102 may include the same ride height. As such, the structural component(s) 112 of the vehicle 102 may not be experiencing the torsion load in the example of FIG. 3A. Because the vehicle 102 is not experiencing the torsion load, the vehicle 102 may determine that there is no deflection. As such, the vehicle 102 may be calibrated while there is no torsion load being applied to the vehicle 102.

For example, the vehicle 102 may generate sensor data using at least sensors 114, such as cameras, where the sensor data represents images (where the image is represented by 302 and 304). The vehicle 102 may then analyze the image 302 in order to identify a point 306 on a surface 308 that is depicted by the image 302. For example, the vehicle 102 may determine that a portion of the image 302 and a portion of the image 304 both depict the point 306. The vehicle 102 may then use this as the starting point for determining the deflection when the torsion load is applied to the vehicle 102.

Figure 3B:
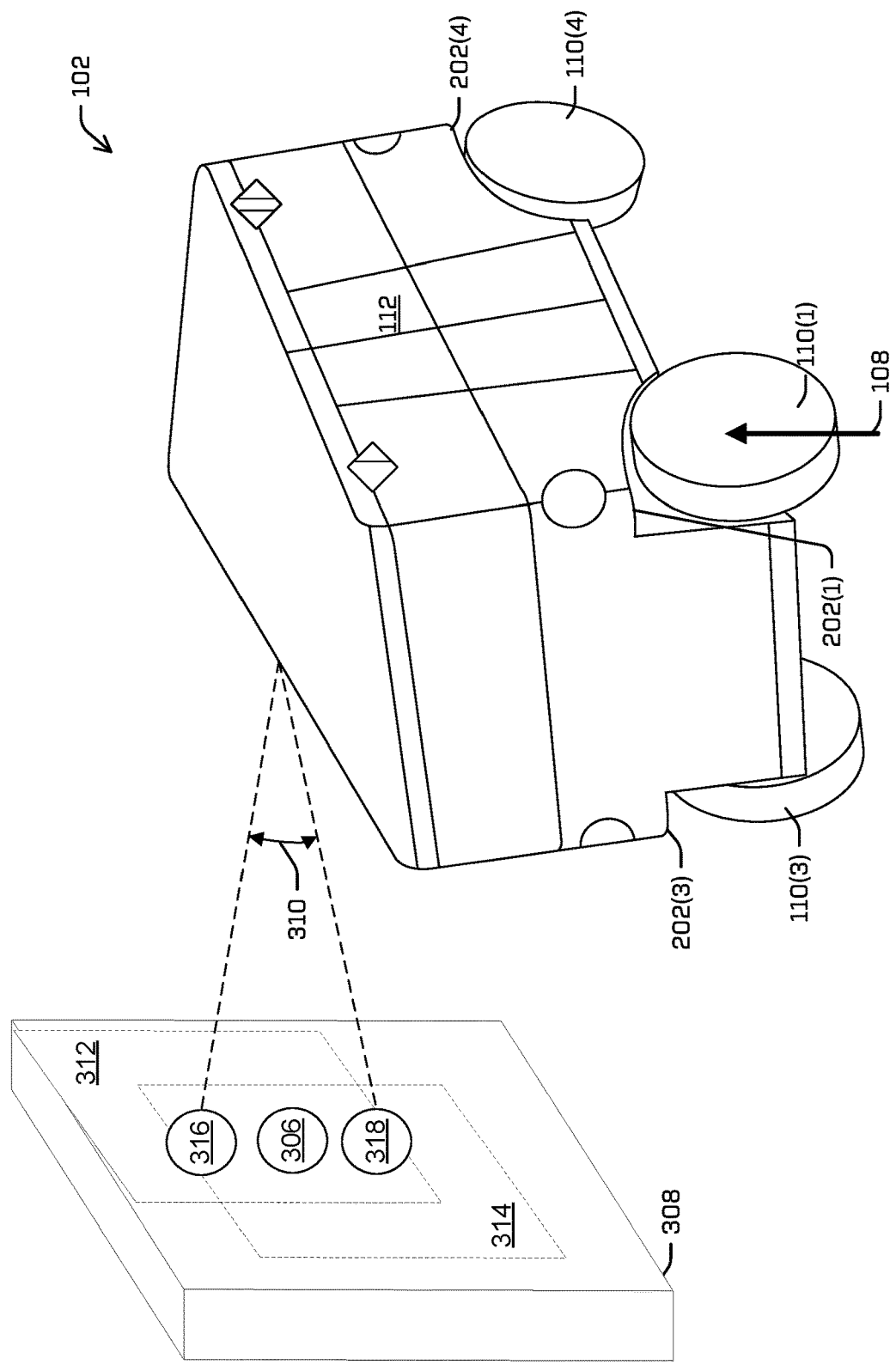
FIG. 3B is a second example of a vehicle determining a deflection when the torsion load is being applied to the vehicle.

For example, FIG. 3B is a second example of the vehicle 102 determining a deflection 310 when the torsion load is being applied to the vehicle 102, in accordance with the disclosure. For instance, and as shown, the vehicle 102 may again apply the force 108 using the suspension of the vehicle 102 by extending the wheels 110(1)-(2). As such, the first corner 202(1) and the second corner 202(2) of the vehicle 102 may rise to a new height, which causes the structural component(s) 112 of the vehicle 102 to experience the torsion load (e.g., a twisting of the structural component(s) 112 causes the torsion load). Because of the torsion load, the vehicle 102 may now be able to determine that there is the deflection 310.

For example, the vehicle 102 may again generate sensor data using the sensor 114, where the sensor data represents an image 312 and an image 314. The vehicle 102 may then analyze the image 312 in order to identify the point 306 on the surface 308 as depicted by the image 312 and analyze the image 314 in order to identify the point 306 as depicted by the image 314. For example, the vehicle 102 may determine that a portion of the image 312 depicts the point 304 and a portion of the image 314 depicts the point 304. The vehicle 102 may then determine the deflection 310 based on the changes from where the point 306 was originally depicted in the image 302 and the image, which is respectively represented by 316 and 318. For instance, and in the example of FIG. 3B, the deflection 310 corresponds to the change between where the point 304 was originally depicted before the torsion load and where the point 304 is now depicted after the torsion load.

While the examples of FIGS. 2A-3B illustrate two different tests for determining a value of a property, in other examples, the vehicle 102 may perform additional and/or alternative tests to determine the value of the property. For example, rather than using the point 306 located on the surface 308 during the test in FIGS. 3A-3B, the vehicle 102 may perform similar processes, but using another sensor 114 of the vehicle 102 rather than the point 306 on the surface 308. For example, the sensor 114 may generate the sensor data representing the other sensor 114 before and after the torsion load is applied. The vehicle 102 may then perform similar processes as those described with respect to FIGS. 3A-3B in order to determine the deflection.

Figure 4:
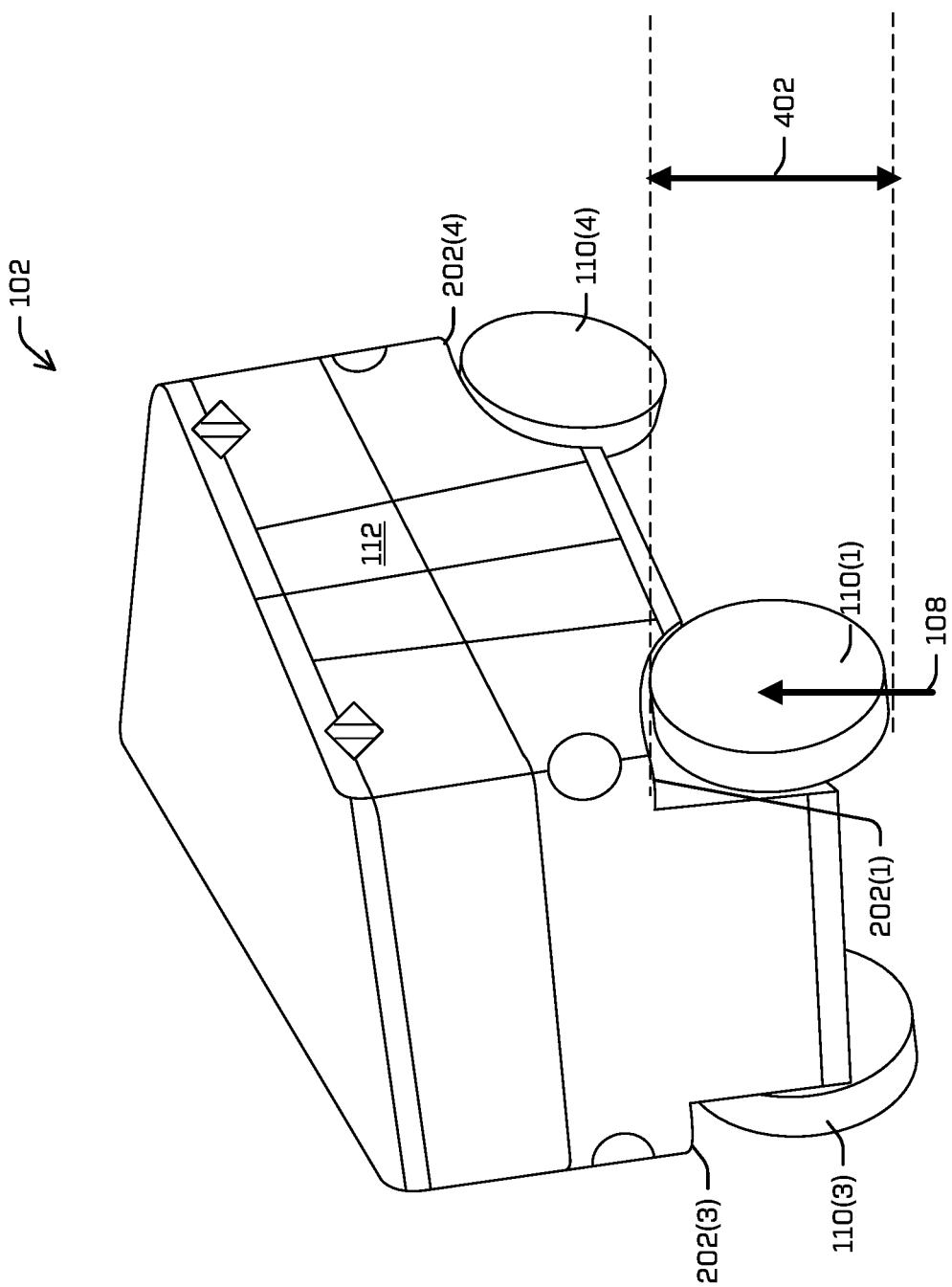
FIG. 4 is an example of a vehicle performing a suspension test.

FIG. 4 is an example of the vehicle 102 performing a suspension test, in accordance with the disclosure. For instance, and as shown, the vehicle 102 may again apply the force 108 using the suspension of the vehicle 102, where the force causes the wheels 110(1)-(2) of the vehicle 102 to extend. As such, the first corner 202(1) and the second corner 202(2) of the vehicle 102 may rise to a new height. The vehicle 102 may then use one or more sensors to determine an actual height 402 of the first corner 202(1) and/or an actual height of the second corner 202(2) (which is not illustrated for clarity reasons). Additionally, the vehicle 102 may compare the actual height 402 of the first corner 202(1) to a first expected height for the first corner 202(1) and/or the actual height of the second corner 202(2) to a second expected height for the second corner 202(1) in order to determine a condition associated with the suspension.

For example, the vehicle 102 may determine that there is not a problem with the suspension based on the actual height 402 being similar to the first expected height, but determine that there is a problem with the suspension based on the actual height 402 not being similar to the first expected height. Additionally, the vehicle 102 may then determine that the is not a problem with the suspension based on the actual height being similar to the second expected height, but determine that there is a problem with the suspension based on the actual height not being similar to the first expected height. As described herein, in some examples, the vehicle 102 may determine that two height are similar when the two heights are within threshold distance and/or threshold percentage to one another, and the vehicle 102 may determine that two height are not similar when the two heights are outside of the threshold distance and/or the threshold percentage from one another.

In some examples, the vehicle 102 may perform the suspension test of FIG. 4 before performing the stiffness tests of FIGS. 2A-3C. For example, the vehicle 102 may perform the stiffness tests of FIGS. 2A-3C based on determining that there are no problems with the suspension(s) of the vehicle 102.

Figure 5:
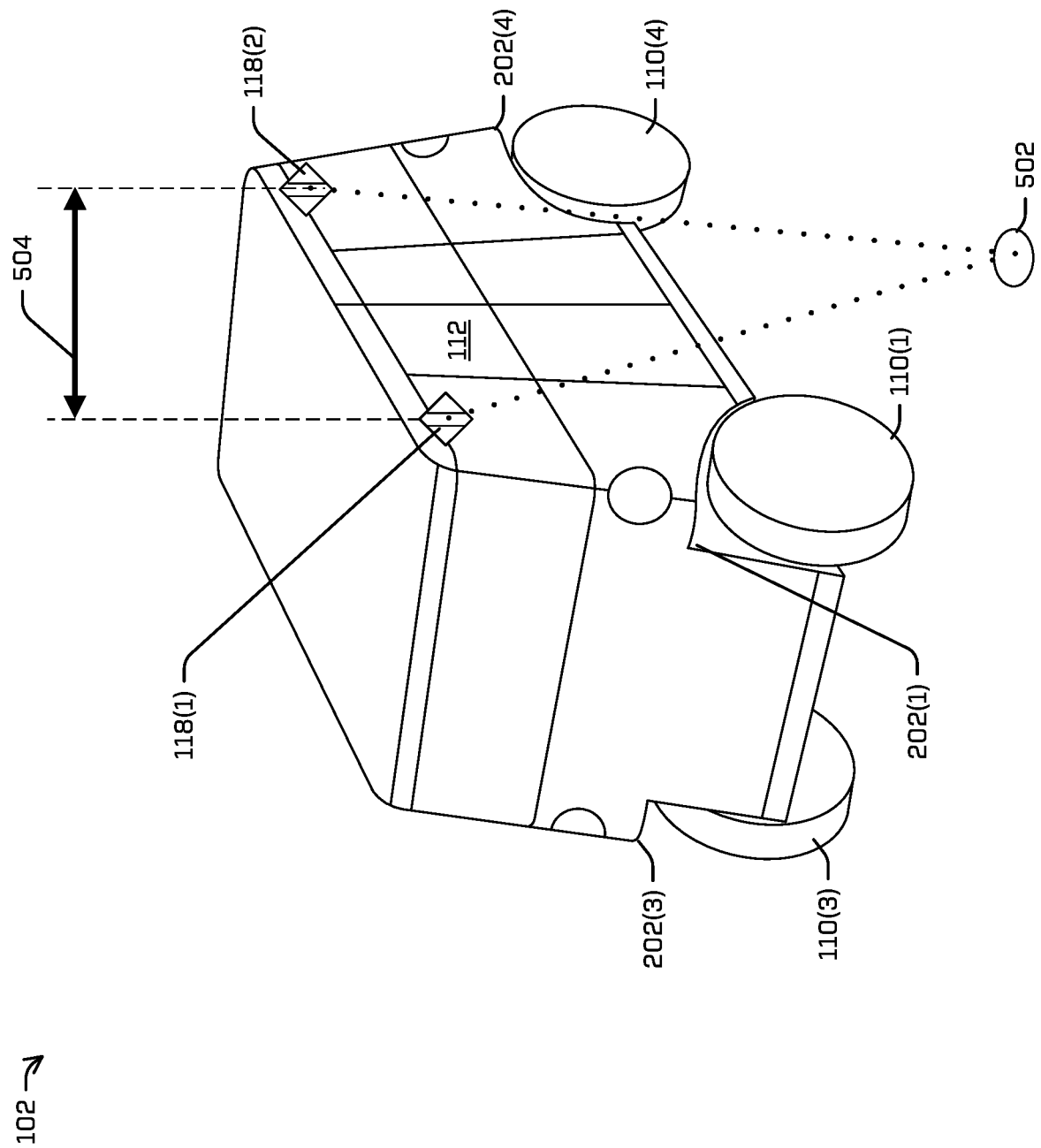
FIG. 5 is an example of a vehicle performing a sensor offset test.

FIG. 5 is an example of the vehicle 102 performing a sensor offset test, in accordance with the disclosure. As shown, the vehicle 102 may generate sensor data using the sensors 114. In the example of FIG. 5, both the first sensor data generated by the first sensor 114(1) and the second sensor data generated by the second sensor 114(2) should represent a point 502. Additionally, based on a calibration of the sensors 114, the vehicle 102 may know that a first portion of the first sensor data and a second portion of the second sensor data should both represent the point 502. This is because the sensors 114 are calibrated such that the first portion of the first sensor data and the second portion of the second sensor data should represent similar objects (e.g., the first portion of the first sensor data should match/overlap the second portion of the second sensor data).

As such, the vehicle 102 may analyze the sensor data in order to determine that a third portion of the first sensor data generated the first sensor 114(1) and that a fourth portion of the second sensor data generated by the second sensor 114(2) both represent the point 502. Based on the third portion of the first sensor data and the fourth portion of the second sensor data representing the point 502, and based on the calibration above, the vehicle 102 may determine an offset 504 between the sensors 114. The vehicle 102 may then use the offset in order to determine if there is a problem with the vehicle 102.

For a first example, the vehicle 102 may compare the offset 504 to a previous offset in order to determine if the offset 504 is within a threshold distance and/or threshold percentage to the previous offset. If the vehicle 102 determines that the offset 504 is within the threshold distance and/or the threshold percentage to the previous offset, then the vehicle 102 may determine that there is not a problem. However, if the vehicle 102 determines that the offset 504 is not within the threshold distance and/or the threshold percentage to the previous offset, then the vehicle 102 may determine that there is a problem.

For a second example, the vehicle 102 may compare the offset 504 to a standard offset in order to determine if the offset 504 is within a threshold distance and/or threshold percentage to the standard offset. In some examples, the standard offset may be for all vehicles that include the sensors 114. If the vehicle 102 determines that the offset 504 is within the threshold distance and/or the threshold percentage to the standard offset, then the vehicle 102 may determine that there is not a problem. However, if the vehicle 102 determines that the offset 504 is not within the threshold distance and/or the threshold percentage to the standard offset, then the vehicle 102 may determine that there is a problem.

In these examples above, the threshold distance may include, but is not limited to, 1 centimeter, 6 centimeters, 10 centimeters, and/or any other distance. Additionally, the threshold percentage may include, but is not limited to, 97%, 98%, 99%, and/or any other percentage. Furthermore, in some examples, the vehicle 102 may perform the sensor offset test of FIG. 5 before performing the stiffness tests of FIGS. 2A-3C. For example, the vehicle 102 may perform the stiffness tests of FIGS. 2A-3C based on determining that there are no problems with the sensors 114 of the vehicle 102.

Figure 6:
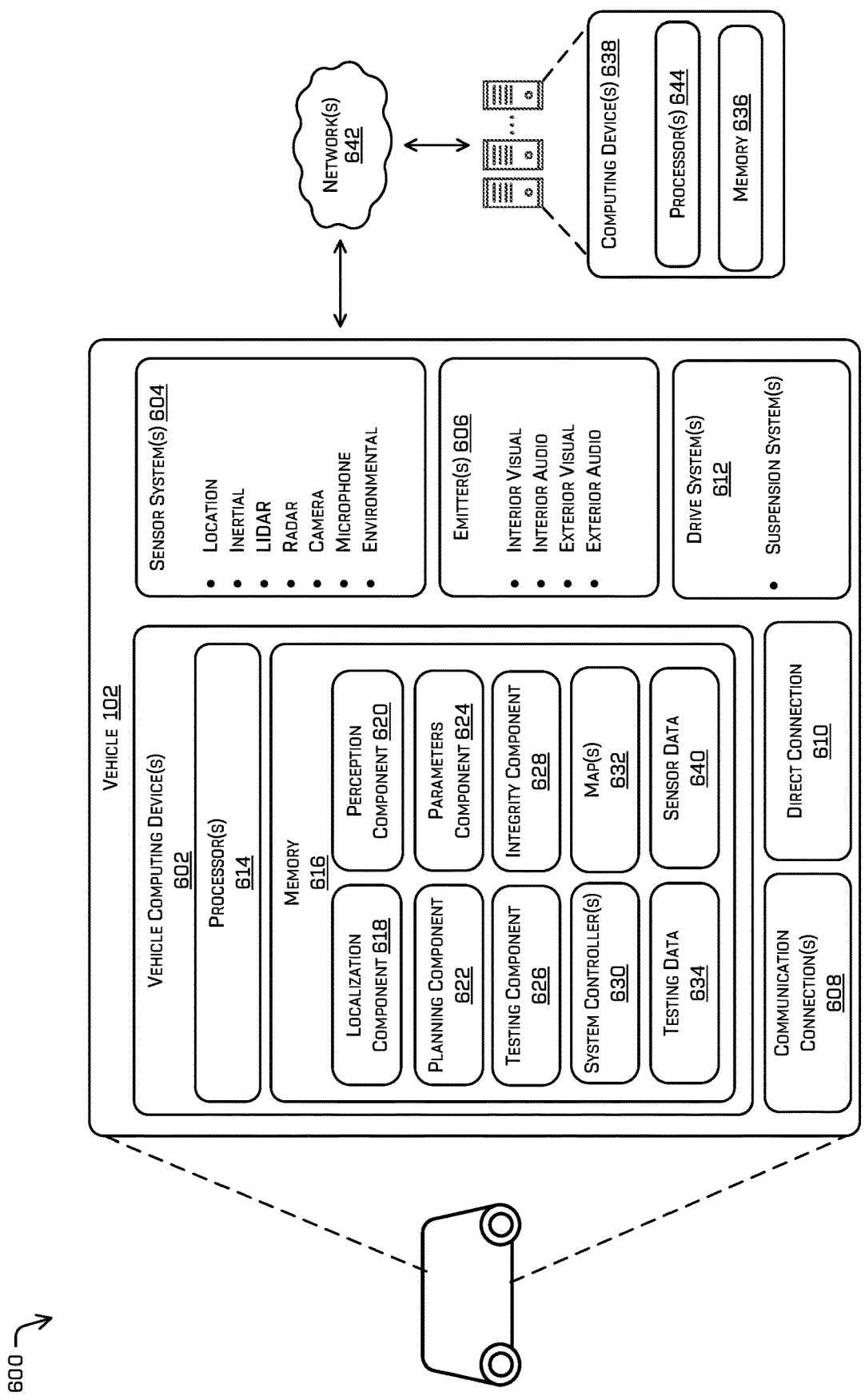
FIG. 6 is a block diagram of an example system for implementing the techniques described herein.

FIG. 6 is a block diagram of an example system 600 for implementing the techniques described herein. In at least one example, the system 600 may include the vehicle 102. As shown, the vehicle 102 may include one or more vehicle computing devices 602, one or more sensor systems 604, one or more emitter 606, one or more communication connections 608, at least one direct connection 610, and one or more drive systems 612.

The vehicle computing device(s) 602 may include one or more processors 614 and memory 616 communicatively coupled with the processor(s) 614. In the illustrated example, the vehicle 102 is an autonomous vehicle; however, the vehicle 102 could be any other type of vehicle, such as a semi-autonomous vehicle, or any other system having at least an image capture device (e.g., a camera enabled smartphone). In the illustrated example, the memory 616 of the vehicle computing device(s) 602 stores a localization component 618, a perception component 620, a planning component 622, a parameters component 624, a testing component 626, an integrity component 628, one or more system controllers 630, one or more maps 632, and testing data 634. Though depicted in FIG. 6 as residing in the memory 616 for illustrative purposes, it is contemplated that the localization component 618, the perception component 620, the planning component 622, the parameters component 624, the testing component 626, the integrity component 628, the system controller(s) 630, the map(s) 632, and/or the testing data 634 may additionally, or alternatively, be accessible to the vehicle 102 (e.g., stored on, or otherwise accessible by, memory remote from the vehicle 102, such as, for example, on memory 636 of one or more remote computing devices 638.

In at least one example, the localization component 618 may include functionality to receive data from the sensor system(s) 604 to determine a position and/or orientation of the vehicle 102 (e.g., one or more of an x-, y-, z-position, roll, pitch, or yaw). For example, the localization component 618 may include and/or request/receive a map of an environment and may continuously determine a location and/or orientation of the vehicle 102 within the map. In some instances, the localization component 618 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 618 may provide data to various components of the vehicle 102 to determine an initial position of the vehicle 102 for generating a path polygon associated with the vehicle path, as discussed herein.

In some instances, the perception component 620 may include functionality to perform object detection, segmentation, and/or classification. In some examples, the perception component 620 may provide processed sensor data 640 that indicates a presence of an agent (e.g., entity) that is proximate to the vehicle 102 and/or a classification of the agent as an agent type (e.g., car, pedestrian, cyclist, animal, building, tree, road surface, curb, sidewalk, unknown, etc.). In some examples, the perception component 620 may provide processed sensor data 640 that indicates a presence of a stationary entity that is proximate to the vehicle 102 and/or a classification of the stationary entity as a type (e.g., building, tree, road surface, curb, sidewalk, unknown, etc.). In additional or alternative examples, the perception component 620 may provide processed sensor data 640 that indicates one or more characteristics associated with a detected agent (e.g., a tracked object) and/or the environment in which the agent is positioned. In some examples, characteristics associated with an agent may include, but are not limited to, an x-position (global and/or local position), a y-position (global and/or local position), a z-position (global and/or local position), an orientation (e.g., a roll, pitch, yaw), an agent type (e.g., a classification), a velocity of the agent, an acceleration of the agent, an extent of the agent (size), etc. Characteristics associated with the environment may include, but are not limited to, a presence of another agent in the environment, a state of another agent in the environment, a time of day, a day of a week, a season, a weather condition, an indication of darkness/light, etc.

In general, the planning component 622 may determine a path for the vehicle 102 to follow to traverse through an environment. For example, the planning component 622 may determine various routes and trajectories and various levels of detail. For example, the planning component 622 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 622 may generate an instruction for guiding the vehicle 102 along at least a portion of the route from the first location to the second location. In at least one example, the planning component 622 may determine how to guide the vehicle 102 from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 102 to navigate.

In some examples, the planning component 622 may include a prediction component to generate predicted trajectories of objects (e.g., agents) in an environment. For example, a prediction component may generate one or more predicted trajectories for agents within a threshold distance from the vehicle 102. In some examples, a prediction component may measure a trace of an object and generate a trajectory for the object based on observed and predicted behavior.

In some instances, the parameters component 624 may be configured to determine testing parameters before and/or during a test of the vehicle 102. As described herein, the testing parameter(s) may include, but are not limited to, vehicle testing parameters and/or environmental testing parameters. A vehicle testing parameter may include, but is not limited to, doors being open/closed, windows being open/closed, a trunk being open/closed, a temperature inside of the vehicle 102, a period of time before last operation of the vehicle 102, a number of passengers within the vehicle 102, position(s) of seat(s) within the vehicle, and/or any other parameter. Additionally, an environmental parameter may include, but is not limited to, weather conditions (e.g., temperature, humidity, etc.), a time of day, week, month, and/or year, and/or any other parameter.

In some examples, the parameters component 624 may compare the determined parameters against set parameters, which may be represented by the testing data 634, in order to determine whether to proceed with a test. For instance, the testing data 634 may represent set parameters that need to be satisfied in order to perform a test on the vehicle 102. For example, the testing data 634 may represent a first parameters indicating a temperature (and/or temperature range) for the test, a second parameter indicating that all of the doors and windows of the vehicle 102 must be closed, a third parameters indicating that the vehicle 102 must not include any passengers during the test, and/or the like. As such, the parameters component 624 may compare the determine parameters to the set parameters in order to determine whether all of the set parameters are satisfied for performing the test.

For a first example, if the testing data 634 represents the first parameter indicating the temperature range, the parameters component 624 may compare the current temperature to the temperature range in order to determine whether the current temperature satisfies (e.g., is within) the temperature range or does not satisfy (e.g., is outside of) the temperature range. For a second example, if the testing data 634 represents the second parameter indicating to close all of the doors and windows of the vehicle 102, the parameters component 624 may determine that the second parameter is satisfied when all of the doors and windows of the vehicle 102 are closed, but determine that the second parameter is not satisfied when at least one door and/or at least one window of the vehicle 102 is open.

Still, for a third example, if the testing data 634 represents the third parameter indicating that the vehicle 102 must not have any passengers, the parameters component 624 may determine that the third parameter is satisfied when there are no passengers within the vehicle 102, but determine that the third parameter is not satisfied when there is at least one passenger within the vehicle 102. While these are just a couple examples of the parameters component 624 determining whether parameters are satisfied for performing a test, in other examples, the parameters component 624 may determine whether additional and/or alternative parameters are satisfied in order to perform the test.

In some examples, the parameters component 624 may further be configured to determine when to perform the test. For example, parameters component 624 may determine to test the vehicle 102 after manufacturing of the vehicle 102 (e.g., perform an initial test of the vehicle 102), at given time intervals (e.g., every two days, every week, every month, every year, etc.), when the vehicle 102 is scheduled for service, and/or when an event occurs that may affect the integrity of the body of the vehicle 102. While these are just a couple instances of when the parameters component 624 may determine when to test the vehicle 102, in other examples, the parameters component 624 may determine to test the vehicle 102 at additional and/or alternative instances.

In some examples, the testing component 626 may be configured to perform the test on the vehicle 102. For example, the testing component 626 may cause the force to be applied using the suspension system(s), where the force causes a retracting and/or an extending of one or more wheels of the vehicle 102. In some examples, the testing component 626 may use the same force each time that the testing component 626 performs the test of the vehicle 102. Additionally, or alternatively, in some examples, the testing component 626 may use a force that causes the wheels(s) of the vehicle 102 to retract and/or extend specific distances that are associated with the test. In either of these examples, the testing component 626 may generate and store testing data 634 representing the force that was applied during the test.

Additionally, in some examples, the testing component 626 may further be configured to perform one or more of the techniques described herein in order to determine a value of a property of the structural component(s), such as a deflection and/or a stiffness associated with the structural component(s). For example, before the force is applied to the suspension system(s) of the vehicle 102, the sensor system(s) 604 may generate first sensor data 640. Additionally, while the force is being applied and the suspension system(s) of the vehicle 102, the sensor system(s) 604 may generate second sensor data 640. The testing component 626 may then be configured to analyze the first sensor data 640 and/or the second sensor data 640 in order to determine the value of the property that is caused by the force. In some examples, the testing component 626 may then be configured to generate testing data 634 representing the value of the property.

Using the value of the property, the integrity component 628 may then be configured to determine the structural integrity of the vehicle 102. For example, the integrity component 628 may be configured to determine a condition of the vehicle 102, such as the structural integrity of the vehicle 102, using a baseline property. In some examples, the baseline property may be associated with a standard property, which may include a range that all vehicles should be within in order for the vehicles to be structurally sound and/or perform as expected. For example, the integrity component 628 may compare the deflection to a range associated with the standard deflection in order to determine whether the deflection satisfies (e.g., is within) the range. In such an example, the integrity component 628 may determine that there is not a problem with the vehicle 102 when the deflection satisfies the range. However, the integrity component 628 may also determine that there is a problem with the vehicle 102 when the deflection does not satisfy (e.g., is outside of) the range. Additionally, the vehicle 102 may perform similar processes to test the stiffness.

Additionally, or alternatively, in some examples, the baseline property may be based on a change in the values of the property that occurs with the vehicle 102, where the change in values is based on one or more previous values determined for the vehicle during previous test(s). For example, the integrity component 628 may determine a difference between the deflection and a previous deflection for the vehicle 102 as determined during a previous test. The previous test may include an initial test of the vehicle 102 (e.g., the first test that occurred after manufacturing of the vehicle 102, but before operation), a preceding test that occurred directly before the current test, and/or any other test performed on the vehicle 102. Using the difference, the integrity component 628 may determine whether there is a problem with the vehicle. For example, the integrity component 628 may determine that there is not a problem with the vehicle 102 when the difference satisfies (e.g., is equal to or less than) a threshold difference. Additionally, the integrity component 628 may determine that there is a problem with the vehicle 102 when the difference does not satisfy (e.g., is greater than) the threshold difference. Additionally, the vehicle 102 may perform similar processes to test the stiffness.

In some examples, the components of the vehicle 102 may perform one or more additional and/or alternative tests when determining the structural integrity of the vehicle 102. For a first example, the testing component 626 may determine actual height(s) of the lifted corner(s) of the vehicle 102. In some examples, the testing component 626 determines the actual height(s) using sensor data 640 generated by the sensor system(s) 604. The integrity component 628 may then compare the actual height(s) of the lifted corner(s) to expected height(s) for the lifter corner(s). If the integrity component 628 determine that the actual height(s) are similar to the expected height(s), then the integrity component 628 may determine that there is no problem with the suspension(s) (e.g., determine that the suspension(s) are operating as intended). However, if the integrity component 628 determine that the actual height(s) are not similar to the expected height(s), then the integrity component 628 may determine that there is a problem with the suspension(s) (e.g., determine that the suspension(s) are not operating as intended).

In some examples, the integrity component 628 may determine that an actual height of a corner is similar to an expected height when the actual height is within a threshold distance to the expected height. The threshold distance may include, but is not limited to, 1 centimeter, 6 centimeters, 10 centimeters, and/or any other distance. Additionally, the integrity component 628 may determine that the actual height of the corner is not similar to the expected height when the actual height is outside of the threshold distance to the expected height.

Additionally, or alternatively, in some examples, the integrity component 628 may determine that an actual height of a corner is similar to an expected height when the actual height is within a percentage to the expected height. The percentage may include, but is not limited to, 97%, 98%, 99%, and/or any other percentage. Additionally, the integrity component 628 may determine that the actual height of the corner is not similar to the expected height when the actual height is outside of the percentage from the expected height.

For a second example, during a calibration process for the testing of the vehicle 102, the testing component 626 may determine an offset between two sensors of the vehicle 102. In some examples, the testing component 626 determines the offset using sensor data 640 generated by the sensor system(s) 604. The integrity component 628 may then use the offset between the sensors in order to detect creep associated with the body of the vehicle 102 and/or mounts of the sensors. For example, the integrity component 628 may compare the offset to a previous offset between the sensors that was determined during the calibration process for a previous test of the vehicle 102. The integrity component 628 may then determine that there is no creep between the sensors when the offset is similar to the previous offset and determine that there is creep when the offset is not similar to the previous offset.

Again, and in some examples, the integrity component 628 may determine that the offset is similar to the previous offset when the offset is within a threshold distance (e.g., 1 centimeter, 6 centimeters, 10 centimeters, etc.) and/or a threshold percentage (e.g., 98%, 99%, etc.) to the previous offset. Additionally, the integrity component 628 may determine that the offset is not similar to the previous offset when the offset is outside of the threshold distance and/or outside of the threshold percentage to the previous offset.

In at least one example, the vehicle computing device(s) 602 may include the system controller(s) 630, which may be configured to control steering, propulsion, braking, safety, emitters, communication, and other systems of the vehicle 102. The system controller(s) 630 may communicate with and/or control corresponding systems of the drive system(s) 612 and/or other components of the vehicle 102.

The memory 616 may further include the map(s) 632 that may be used by the vehicle 102 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 102 may be controlled based at least in part on the map(s) 632. That is, the map(s) 632 may be used in connection with the localization component 618, the perception component 620, and/or the planning component 622 to determine a location of the vehicle 102, detect objects in an environment, and/or generate routes and/or trajectories to navigate within an environment.

In some examples, the map(s) 632 may be stored on a remote computing device(s) (such as the computing device(s) 638) accessible via network(s) 642. In some examples, multiple maps 632 may be stored based on, for example, a characteristic (e.g., type of entity, time of day, day of week, season of the year, etc.). Storing multiple maps 632 may have similar memory requirements, but increase the speed at which data in a map may be accessed.

As can be understood, the components discussed herein (e.g., the localization component 618, the perception component 620, the planning component 622, the parameters component 624, the testing component 626, and the integrity component 628) are described as divided for illustrative purposes. However, the operations performed by the various components may be combined or performed in any other component. For instance, in some examples, aspects of some or all of the components discussed herein may include any models, techniques, and/or machine learning techniques. For example, in some instances, the components in the memory 616 (and the memory 636, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet60, ResNet101, VGG, DenseNet, PointNet, and the like.

In at least one example, the sensor system(s) 604 may include lidar sensors, radar sensors, ultrasonic transducers, sonar sensors, location sensors (e.g., GPS, compass, etc.), inertial sensors (e.g., IMUs, accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 604 may include multiple instances of each of these or other types of sensors. For instance, the lidar sensors may include individual lidar sensors located at the corners, front, back, sides, and/or top of the vehicle 102. As another example, the camera sensors may include multiple cameras disposed at various locations about the exterior and/or interior of the vehicle 102. The sensor system(s) 604 may provide input to the vehicle computing device(s) 602. Additionally or alternatively, the sensor system(s) 604 may send sensor data 640, via the one or more networks 642, to the computing device(s) 638 at a particular frequency, after a lapse of a predetermined period of time, in near real-time, etc.

The vehicle 102 may also include emitter(s) 606 for emitting light and/or sound, as described above. The emitter(s) 606 in this example include interior audio and visual emitters to communicate with passengers of the vehicle 102. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 606 in this example also include exterior emitters. By way of example and not limitation, the exterior emitters in this example include lights to signal a direction of travel or other indicator of vehicle maneuver (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 102 may also include the communication connection(s) 608 that enable communication between the vehicle 102 and one or more other local or remote computing device(s). For instance, the communication connection(s) 608 may facilitate communication with other local computing device(s) on the vehicle 102 and/or the drive system(s) 612. Also, the communication connection(s) 608 may allow the vehicle to communicate with other nearby computing device(s) (e.g., computing device(s) 638, other nearby vehicles, etc.).

The communications connection(s) 608 may include physical and/or logical interfaces for connecting the vehicle computing device(s) 602 to another computing device or a network, such as network(s) 642. For example, the communications connection(s) 608 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 102 may include drive system(s) 612. In some examples, the vehicle 102 may have a single drive system 612. In at least one example, if the vehicle 102 has multiple drive systems 612, individual drive systems 612 may be positioned on opposite ends of the vehicle 102 (e.g., the front and the rear, etc.). In at least one example, the drive system(s) 612 may include one or more sensor systems to detect conditions of the drive system(s) 612 and/or the surroundings of the vehicle 102. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 612. In some cases, the sensor system(s) on the drive system(s) 612 may overlap or supplement corresponding systems of the vehicle 102 (e.g., sensor system(s) 604).

The drive system(s) 612 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, suspension system(s) including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 612 may include a drive system controller which may receive and preprocess data from the sensor system(s) and to control operation of the various vehicle systems. In some examples, the drive system controller may include one or more processors and memory communicatively coupled with the one or more processors. The memory may store one or more systems to perform various functionalities of the drive system(s) 612. Furthermore, the drive system(s) 612 may also include one or more communication connection(s) that enable communication by the respective drive system with one or more other local or remote computing device(s).

The suspension system(s) may be controlled to adjust a vertical acceleration experienced by at least a portion of the vehicle 102. The suspension may comprise an active suspension system this is configured to actively control a ride height of the vehicle (or individual struts of the vehicle), or a semi-active suspension system in which damping force and/or spring constant of the suspension system or individual components thereof can be adjusted without adjusting the ride height of the suspension system or component. In the case of an active suspension system, the suspension system may be controlled by varying degrees to adjust at least a portion of a ride height of the vehicle. Additionally, an active suspension may help minimizing vertical acceleration due to small changes in elevation of the road (e.g., uphill or downhill).

In some instances, the vehicle 102 may include a first suspension system located at the front (or first end) of the vehicle 102 and a second suspension system located at the rear (or second end) of the vehicle 102. The first suspension and the second suspension system may include various components, such as valve blocks, actuators, strut(s), fluid reservoirs, pump(s), accumulator(s), and so forth. In some instances, strut(s) of the first suspension system and the second suspension system may be actuated to similar or different lengths (e.g., travel length). For example, the struts of the first suspension may be extended to a first length and the struts of the second suspension system may be extended to a second length that is greater than the first length. As a result, the rear of the vehicle may be disposed closer to the ground than the front of the vehicle.

In at least one example, the direct connection 610 may provide a physical interface to couple the one or more drive system(s) 612 with the body of the vehicle 102. For example, the direct connection 610 may allow the transfer of energy, fluids, air, data, etc. between the drive system(s) 612 and the vehicle. In some instances, the direct connection 610 may further releasably secure the drive system(s) 612 to the body of the vehicle 102.

In at least one example, the localization component 618, the perception component 620, the planning component 622, the testing component 626, the parameters component 624, the integrity component 628, the system controller(s) 630, and/or the map(s) 632 may process sensor data 640, as described above, and may send their respective outputs, over the one or more network(s) 642, to the computing device(s) 638. In at least one example, the localization component 618, the perception component 620, the planning component 622, the parameters component 624, the testing component 626, the integrity component 628, the system controller(s) 630, and/or the map(s) 632 may send their respective outputs to the computing device(s) 638 at a particular frequency, after a lapse of a predetermined period of time, in near real-time, etc.

In some examples, the vehicle 102 may send sensor data 640 to the computing device(s) 638 via the network(s) 642. In some examples, the vehicle 102 may receive sensor data 640 from the computing device(s) 638 via the network(s) 642. The sensor data 640 may include raw sensor data and/or processed sensor data and/or representations of sensor data. In some examples, the sensor data 640 (raw or processed) may be sent and/or received as one or more log files.

The computing device(s) 638 may include processor(s) 644 and the memory 636. The processor(s) 614 of the vehicle 102 and the processor(s) 644 of the computing device(s) 638 may be any suitable processor capable of executing instructions to process data and perform operations as described herein. By way of example and not limitation, the processor(s) 614 and 644 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 616 and 636 are examples of non-transitory computer-readable media. The memory 616 and 636 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 616 and 636 may include at least a working memory and a storage memory. For example, the working memory may be a high-speed memory of limited capacity (e.g., cache memory) that is used for storing data to be operated on by the processor(s) 614 and 644. In some instances, the memory 616 and 636 may include a storage memory that may be a lower-speed memory of relatively large capacity that is used for long-term storage of data. In some cases, the processor(s) 614 and 644 cannot operate directly on data that is stored in the storage memory, and data may need to be loaded into a working memory for performing operations based on the data, as discussed herein.

It should be noted that while FIG. 6 is illustrated as a distributed system, in alternative examples, components of the vehicle 102 may be associated with the computing device(s) 638 and/or components of the computing device(s) 638 may be associated with the vehicle 102. That is, the vehicle 102 may perform one or more of the functions associated with the computing device(s) 638, and vice versa.

Figure 7:
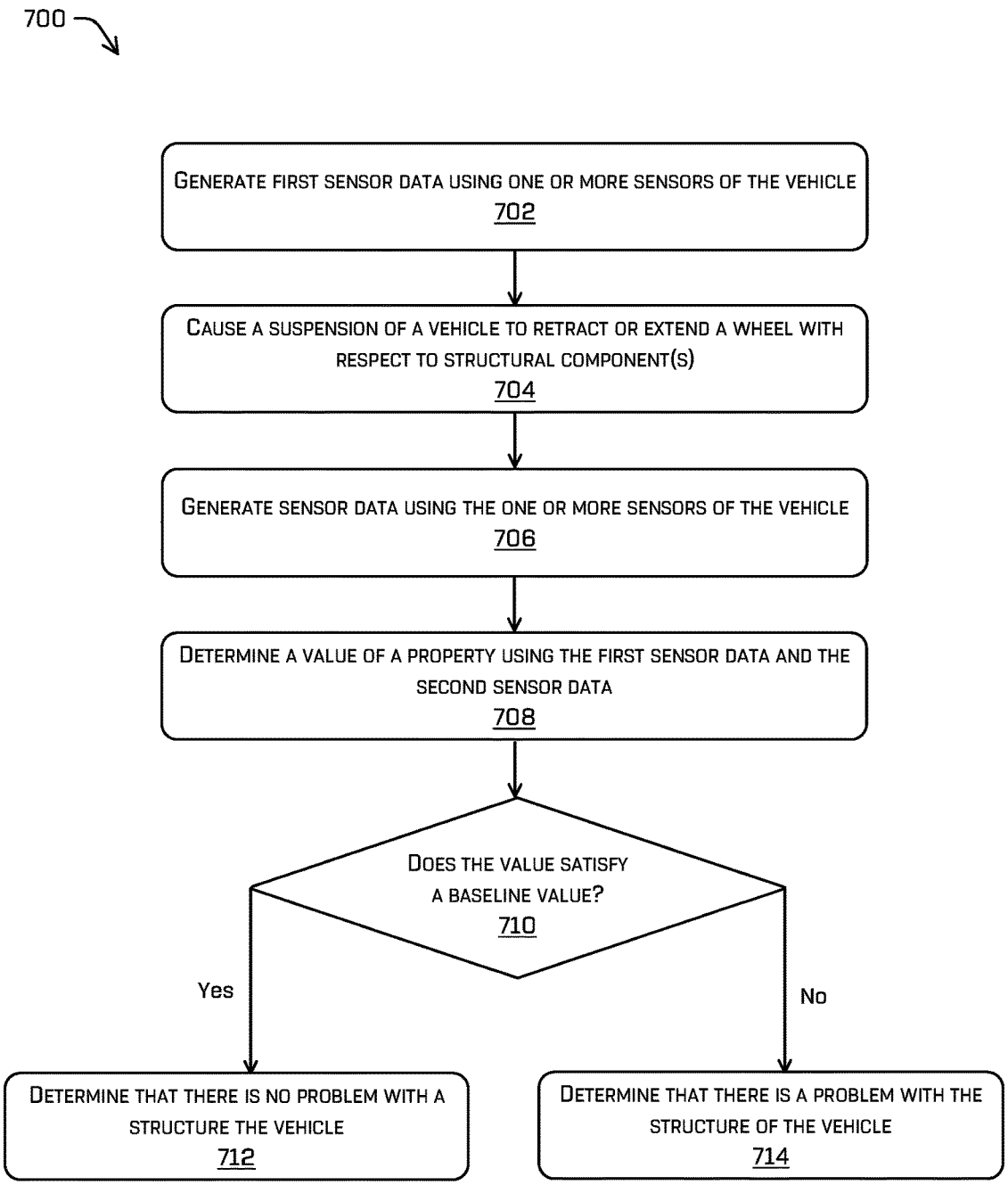
FIG. 7 depicts an example process for testing structural component(s) of a vehicle.
Figure 8:
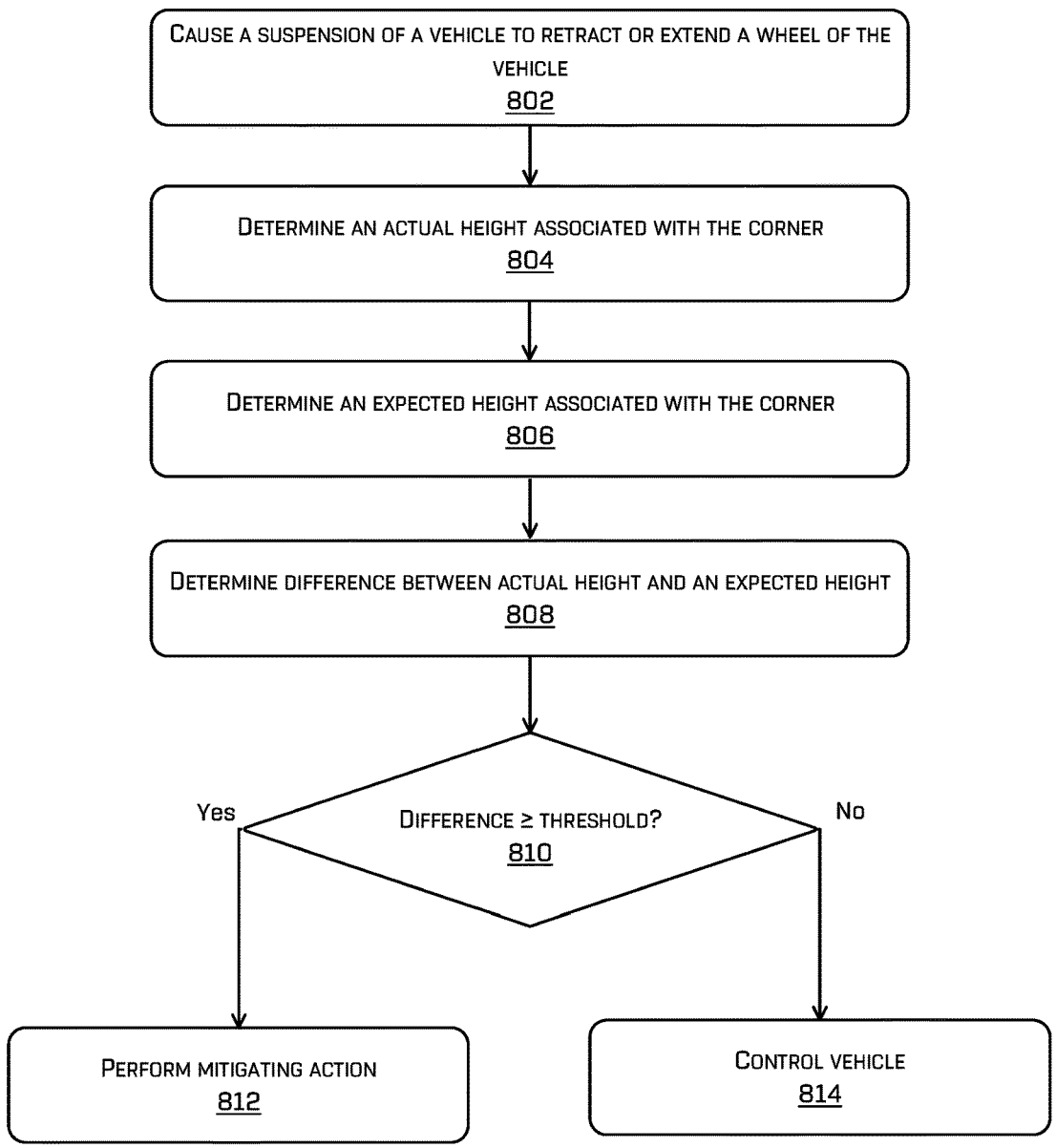
FIG. 8 depicts an example process for testing a suspension of a vehicle.

FIGS. 7-8 illustrate example processes in accordance with the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 7 depicts an example process 700 for testing structural component(s) of a vehicle, in accordance with the disclosure. At operation 702, the process 700 may include generating first sensor data using one or more sensors. For instance, when the suspension is in a first state (e.g., no torsion load being applied to the vehicle 102), the vehicle 102 may generate the first sensor data using the sensor(s). In some examples, the vehicle 102 generates the first sensor data using at least two sensors, where the at least two sensors include a same type of sensor.

At operation 704, the process 700 may include causing a suspension of a vehicle to retract or extend a wheel with respect to structural component(s). For instance, the vehicle 102 may use the suspension of the vehicle 102 in order to retract or extend one or more wheels of the vehicle 102 with respect to the structural component(s) of the vehicle 102. In some examples, the vehicle 102 uses the suspension to extend opposing wheels of the vehicle 102. For example, the vehicle 102 may use the suspension to extend the front-left and back-right wheels of the vehicle 102 or extend the front-right and back-left wheels of the vehicle 102. By extending the opposing wheels of the vehicle 102, the vehicle 102 may create a torsion load on the structural component(s) of the vehicle 102.

At operation 706, the process 700 may include generating second sensor data using the one or more sensors and at operation 708, the process 700 may include determining a value of a property using the first sensor data and the second sensor data. For instance, when the suspension is in the second state (e.g., when the wheels(s) of the vehicle 102 are retracted or extended), the vehicle 102 may generate the second sensor data using the sensor(s). In some examples, the vehicle 102 generates the second sensor data using the at least two sensors that generated the first sensor data. The vehicle 102 may then analyze the first sensor data and the second sensor data, using one or more of the processes described herein, in order to determine the value of the property. As described herein, the property may include, but is not limited to, a deflection, a stiffness, and/or any other property associated with the structural component(s) of the vehicle 102

At operation 710, the process 700 may include determining whether the value satisfies a baseline value. For instance, the vehicle 102 may determine whether the value satisfies the baseline value. As described herein, in some examples, the baseline value includes a standard value, such as a range for all vehicles to be within in order for the vehicles to be structurally sound and/or perform as expected. For a first example, the vehicle 102 may compare the deflection to the range associated with the standard deflection in order to determine whether the deflection satisfies (e.g., is within) the range. For a second example, the vehicle 102 may compare the stiffness to the range associated with the standard stiffness in order to determine whether the stiffness satisfies (e.g., is within) the range.

Additionally, or alternatively, in some examples, the baseline value may be associated with a threshold change in values that occurs with the vehicle 102. For example, the vehicle 102 may determine a difference between the deflection (and/or stiffness) and a previous deflection (and/or stiffness) for the vehicle 102, where the previous deflection (and/or stiffness) is determined during a previous test. The previous test may include an initial test of the vehicle 102 (e.g., the first test that occurred after manufacturing of the vehicle 102, but before operation), a preceding test that occurred directly before the current test, and/or any other test performed on the vehicle 102. The vehicle 102 may then compare the difference to the threshold change in order to determine if the difference satisfies (e.g., is within) the threshold change.

If, at operation 710, it is determined that the value satisfies the baseline value, then at operation 712, the process 700 may include determining that there is no problem with the vehicle. For instance, the vehicle 102 may determine that the value satisfies the range and/or that the difference satisfies the threshold change. Based on the determination(s), the vehicle 102 may determine that there is no problem with the structural integrity of the vehicle 102. In some examples, the vehicle 102 may then perform one or more actions based on determining that there is no problem. For example, the vehicle 102 may generate data representing the results of the test, generate data indicating that there is no problem, continue operating as intended, and/or the like.

However, if, at operation 710, it is determined that the value does not satisfy the baseline value, then at operation 714, the process 700 may include determining that there is a problem with the vehicle. For instance, the vehicle 102 may determine that the value does not satisfy the range and/or that the difference does not satisfy the threshold change in stiffness. Based on the determination(s), the vehicle 102 may determine that there is the problem with the structural integrity of the vehicle 102. In some examples, the vehicle 102 may then perform one or more actions based on determining that there is the problem. For example, the vehicle 102 may generate data representing the results of the test, generate data indicating that there is the problem, cease from operating as intended, and/or the like.

FIG. 8 depicts an example process 800 for testing a suspension of a vehicle, in accordance with the disclosure. At operation 802, the process 800 may include causing a suspension of a vehicle to retract or extend a wheel of the vehicle and at operation 804, the process 800 may include determining an actual height associated with the corner. For instance, the vehicle 102 may use the suspension of the vehicle 102 in order to retract or extend the wheel. In some examples, the vehicle 102 extract or extends the wheel in order to perform a structural integrity test on the vehicle 102 (illustrated by the example process 800). After retracting or extending the wheel of the vehicle 102, the vehicle 102 may determine the actual height of the corner. In some examples, the vehicle 102 determines the actual height using one or more sensors.

At operation 806, the process 800 may include determining an expected height associated with the corner and at operation 808, the process 800 may include determining a difference between the actual height and an expected height. For instance, the vehicle 102 may determine the difference between the actual height and the expected height, where the expected height may be based on the amount of force that was applied to the suspension to lift the corner.

At operation 810, the process 800 may include determining whether the difference is equal to or greater than a threshold. For instance, the vehicle 102 may determine if the difference is equal to or greater than the threshold. If, at operation 810, it is determined that the difference is equal to or greater than the threshold, then at operation 812, the process 800 may include performing a mitigating action. For instance, if the vehicle 102 determines that the difference is equal to or greater than the threshold, then the vehicle 102 may perform the mitigating action. In some examples, performing the mitigating action may include, but is not limited to, causing an inspection of the vehicle 102, causing a servicing of the vehicle 102, causing a change in an operation of the vehicle 102 (e.g., reducing a speed or performance), and/or any other action.

However, if, at operation 810, it is determined that the difference is less than the threshold, then at operation 814, the process 800 may include controlling the vehicle. For instance, if the vehicle 102 determines that the difference is less than the threshold, then the vehicle 102 may perform one or more actions. In some examples, performing the one or more actions may include, but is not limited to, performing a test of the vehicle 102, continuing operating the vehicle 102 as intended, and/or one or more additional actions.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A: A vehicle comprising: a structural component providing rigidity to the vehicle; a sensor disposed on the vehicle; a suspension coupled to the structural component; a wheel coupled to the suspension; one or more processors; and one or more non-transitory computer-readable media storing instructions that, when executed by the one or more processors, cause the one or more processors to perform operations comprising: receiving, from the sensor, first sensor data associated with a first state of the suspension; causing the suspension to transition to a second state of the suspension wherein the wheel is either extended or retracted from the vehicle; receiving, from the sensor, second sensor data associated with the second state of the suspension; determining, based at least in part on the first sensor data and the second sensor data, a deflection associated with the structural component; and determining a condition of the vehicle based at least in part on the deflection.

B: The vehicle as recited in paragraph A, wherein the deflection is a first deflection and determining the first deflection occurs at a first time, and wherein the operations further comprise: receiving third sensor data from the sensor; determining, at a second time and based at least in part on the third sensor data, a second deflection associated with the structural component; and determining a change in deflection associated with the structural component based at least in part on the first deflection and the second deflection, wherein determining the condition of the vehicle is based at least in part on the change in deflection.

C: The vehicle as recited in either paragraph A or paragraph B, wherein the deflection is a first deflection, and wherein the operations further comprise: receiving data representing a second deflection associated with the second state, wherein determining the condition of the vehicle is based at least in part on the second deflection.

D: The vehicle as recited in any one of paragraphs A-C, the operations further comprising: determining a force associated with causing the suspension to transition to the second state; and determining a stiffness associated with the structural component based at least in part on the deflection and the force.

E: The vehicle as recited in any one of paragraphs A-D, wherein determining the deflection comprises at least: determining that a portion of the first sensor data represents a point; determining that a portion of the second sensor data represents the point; and determining the deflection based at least in part on the portion of the first sensor data and the portion of the second sensor data.

F: A method comprising: causing a suspension component associated with a vehicle to extend or retract a wheel of the vehicle with respect to a structural component; while the wheel of the vehicle is extended or retracted, measuring, via a sensor, a value of a property of the structure component of the vehicle; and determining, based at least in part on the value of the property of the structural component, a condition of the vehicle associated with the property of the structural component while the wheel of the vehicle is extended or retracted.

G: The method as recited in paragraph F, wherein the wheel is a first wheel, and wherein the method further comprises causing the suspension to extend to retract a second wheel of the vehicle with respect to the structural component.

H: The method as recited in either paragraph F or paragraph G, wherein the property of the structural component includes a deflection of the structural component.

I: The method as recited in any one of paragraphs F-H, wherein measuring the value of the property of the structure component of the vehicle comprises at least: measuring, via the sensor, a deflection of the structural component; determining a force associated with causing the suspension to retract or extend the wheel; and determining the value of a stiffness of the structural component, the stiffness including the property of the structural component J: The method as recited in any one of paragraphs F-I, wherein the value of the property is a first value of the property and measuring the first value of the property occurs at a first time, and wherein the method further comprises: causing the suspension component to again extend or retract the wheel of the vehicle with respect to the structural component; and while the wheel of the vehicle is extended or retracted, measuring, at a second time and via the sensor, a second value of the property of the structure component of the vehicle.

K: The method as recited in paragraph J, further comprising: determining a difference between the first value of the property and the second value of the property, wherein determining the condition is based at least in part on the difference.

L: The method as recited in any one of paragraphs F-K, further comprising: receiving data representing a range of values associated with the property; and determining whether the value is within the range of values, wherein determining the condition is based at least in part on whether the value is within the range of values.

M: The method as recited in any one of paragraphs F-L, further comprising: determining a parameter associated with testing the vehicle, the parameter including at least one of: a first status associated with a door of the vehicle; a second status associated with a window of the vehicle; a first temperature associated with inside the vehicle; a number of passengers within the vehicle; or a second temperature associated with an environment in which the vehicle is located; and determining to test the vehicle based at least in part on the parameter.

N: The method as recited in any one of paragraphs F-M, further comprising determining to test the vehicle based at least in part on at least one of: a service being performed on the vehicle; a period of time elapsing since a previous test associated with the vehicle; or an event occurring while operating the vehicle.

O: The method as recited in any one of paragraphs F-N, wherein the sensor comprises at least one of: a lidar sensor; a camera; a sonar sensor; a time-of-flight sensor; or an inertial measurement sensor.

P: The method as recited in any one of paragraphs F-O, wherein the property includes a deflection, and wherein measuring the value of the deflection comprises at least: receiving sensor data from the sensor; analyzing the sensor data to determine that a portion of the sensor data represents a point; and determining the value of the deflection based at least in part on the portion of the sensor data representing the point.

Q: The method as recited in any one of paragraphs F-P, further comprising: determining a ride height associated with the vehicle after the suspension causes the wheel to retract or extend; determining whether the ride height satisfies an expected height; and determining a condition associated with the suspension based at least in part on whether the ride height satisfies the expected height.

R: One or more non-transitory computer-readable media storing instructions that, when executed by one or more processors, cause the one or more processors to perform operations comprising: causing a suspension component associated with a vehicle to extend or retract a wheel of the vehicle with respect to a structural component; while the wheel of the vehicle is extended or retracted, generating sensor data using a sensor of the vehicle; determining a value of a property of the structural component based at least in part on the sensor data; and determining, based at least in part on the value of the property, a condition of the vehicle.

S: The one or more non-transitory computer-readable media as recited in paragraph R, wherein the property includes at least one of a deflection or a stiffness of the structural component.

T: The one or more non-transitory computer-readable media as recited in either paragraph R or paragraph S, the operations further comprising: determining whether the value of the property satisfies a threshold value, wherein determining the condition of the vehicle is based at least in part on whether the value of the property satisfies the threshold value.

What is claimed is:

1. A vehicle comprising:
a structural component providing rigidity to the vehicle;
a sensor disposed on the vehicle;
a suspension coupled to the structural component;
a wheel coupled to the suspension;
one or more processors; and
one or more non-transitory computer-readable media storing instructions that, when executed by the one or more processors, cause the one or more processors to perform operations comprising:
receiving, from the sensor, first sensor data associated with a first state of the suspension;
causing the suspension to transition to a second state of the suspension wherein the wheel is either extended or retracted from the vehicle;
receiving, from the sensor, second sensor data associated with the second state of the suspension;
determining, based at least in part on the first sensor data and the second sensor data, a deflection associated with the structural component; and
determining a condition of the vehicle based at least in part on a comparison of the deflection and a baseline deflection for the vehicle.

2. The vehicle as recited in claim 1, wherein the deflection is a first deflection and determining the first deflection occurs at a first time, and wherein the operations further comprise:
receiving third sensor data from the sensor;
determining, at a second time and based at least in part on the third sensor data, a second deflection associated with the structural component; and
determining a change in deflection associated with the structural component based at least in part on the first deflection and the second deflection,
wherein determining the condition of the vehicle is based at least in part on the change in deflection.

3. The vehicle as recited in claim 1, wherein the deflection is a first deflection, and wherein the operations further comprise:
receiving data representing a second deflection associated with the second state, wherein determining the condition of the vehicle is based at least in part on the second deflection.

4. The vehicle as recited in claim 1, the operations further comprising:
   determining a force associated with causing the suspension to transition to the second state; and
   determining a stiffness associated with the structural component based at least in part on the deflection and the force.

5. The vehicle as recited in claim 1, wherein determining the deflection comprises at least:
   determining that a portion of the first sensor data represents a point in an environment of the vehicle;
   determining that a portion of the second sensor data represents the point; and
   determining the deflection based at least in part on the portion of the first sensor data and the portion of the second sensor data.

6. A method comprising:
   causing a suspension component associated with a vehicle to extend or retract a wheel of the vehicle with respect to a structural component;
   while the wheel of the vehicle is extended or retracted, measuring, via a sensor, a value of a property of the structural component of the vehicle based at least in part on a deflection of the structural component while the wheel of the vehicle is extended or retracted; and
   determining, based at least in part on a comparison of the value of the property of the structural component and a corresponding baseline value for the property, a condition of the vehicle associated with the property of the structural component while the wheel of the vehicle is extended or retracted.

7. The method as recited in claim 6, wherein the wheel is a first wheel, and wherein the method further comprises causing the suspension component to extend to retract a second wheel of the vehicle with respect to the structural component.

8. The method as recited in claim 6, wherein the property of the structural component includes a deflection of the structural component.

9. The method as recited in claim 6, wherein measuring the value of the property of the structural component of the vehicle comprises at least:
   measuring, via the sensor, a deflection of the structural component;
   determining a force associated with causing the suspension component to retract or extend the wheel; and
   determining the value of a stiffness of the structural component, the stiffness including the property of the structural component.

10. The method as recited in claim 6, wherein the value of the property is a first value of the property and measuring the first value of the property occurs at a first time, and wherein the method further comprises:
    causing the suspension component to again extend or retract the wheel of the vehicle with respect to the structural component; and
    while the wheel of the vehicle is extended or retracted, measuring, at a second time and via the sensor, a second value of the property of the structural component of the vehicle.

11. The method as recited in claim 10, further comprising:
    determining a difference between the first value of the property and the second value of the property,
    wherein determining the condition is based at least in part on the difference.

12. The method as recited in claim 6, further comprising:
    receiving data representing a range of values associated with the property; and
    determining whether the value is within the range of values,
    wherein determining the condition is based at least in part on whether the value is within the range of values.

13. The method as recited in claim 6, further comprising:
    determining a parameter associated with testing the vehicle, the parameter including at least one of:
       a first status associated with a door of the vehicle;
       a second status associated with a window of the vehicle;
       a first temperature associated with inside the vehicle;
       a number of passengers within the vehicle; or
       a second temperature associated with an environment in which the vehicle is located; and
    determining to test the vehicle based at least in part on the parameter.

14. The method as recited in claim 6, further comprising determining to test the vehicle based at least in part on at least one of:
    a service being performed on the vehicle;
    a period of time elapsing since a previous test associated with the vehicle; or
    an event occurring while operating the vehicle.

15. The method as recited in claim 6, wherein the sensor comprises at least one of:
    a lidar sensor;
    a camera;
    a sonar sensor;
    a time-of-flight sensor; or
    an inertial measurement sensor.

16. The method as recited in claim 6, wherein the property includes a deflection, and wherein measuring the value of the deflection comprises at least:
    receiving sensor data from the sensor;
    analyzing the sensor data to determine that a portion of the sensor data represents a point in an environment of the vehicle; and
    determining the value of the deflection based at least in part on the portion of the sensor data representing the point.

17. The method as recited in claim 6, further comprising:
    determining a ride height associated with the vehicle after the suspension component causes the wheel to retract or extend;
    determining whether the ride height satisfies an expected height; and
    determining a condition associated with the suspension component based at least in part on whether the ride height satisfies the expected height.

18. One or more non-transitory computer-readable media storing instructions that, when executed by one or more processors, cause the one or more processors to perform operations comprising:
    causing a suspension component associated with a vehicle to extend or retract a wheel of the vehicle with respect to a structural component;
    while the wheel of the vehicle is extended or retracted, generating sensor data using a sensor of the vehicle;
    determining a value of a property of the structural component based at least in part on the sensor data, wherein the value of the property is determined based at least in part on a deflection of the structural component while the wheel of the vehicle is extended or retracted; and determining, based at least in part on a comparison of the value of the property and a corresponding baseline value for the property, a condition of the vehicle.

19. The one or more non-transitory computer-readable media as recited in claim 18, wherein the property includes at least one of the deflection or a stiffness of the structural component.

20. The one or more non-transitory computer-readable media as recited in claim 18, the operations further comprising:
   determining whether the value of the property satisfies a threshold value,
   wherein determining the condition of the vehicle is based at least in part on whether the value of the property satisfies the threshold value.

* * * * *